(12) United States Patent
Hurwitz

(10) Patent No.: US 6,309,544 B1
(45) Date of Patent: Oct. 30, 2001

(54) METHODS FOR MAKING DYNAMIC FILTER ASSEMBLIES

(75) Inventor: Mark F. Hurwitz, Ithaca, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/629,897

(22) Filed: Jul. 31, 2000

Related U.S. Application Data

(62) Division of application No. 09/051,354, filed as application No. PCT/US96/15782 on Oct. 9, 1996, now Pat. No. 6,168,724.
(60) Provisional application No. 60/022,161, filed on Jul. 19, 1996, and provisional application No. 60/004,971, filed on Oct. 10, 1995.

(51) Int. Cl.$^7$ .............................. B01D 29/05; B01D 35/00
(52) U.S. Cl. .................. 210/330; 210/360.1; 210/380.1; 210/323.1
(58) Field of Search .................... 210/780, 781, 210/787, 323.1, 330, 360.1, 380.1

(56) References Cited

U.S. PATENT DOCUMENTS

| | | | |
|---|---|---|---|
| 5,143,630 | * | 9/1992 | Rolchigo ............................ 210/780 |
| 5,275,725 | * | 1/1994 | Ishii et al. ...................... 210/321.67 |
| 5,707,517 | | 1/1998 | Rolchigo et al. .................... 210/330 |

FOREIGN PATENT DOCUMENTS

| | | |
|---|---|---|
| 0 083 005 | 7/1983 | (EP) . |
| WO 92/21426 | 12/1992 | (WO) . |
| WO 95/00231 | 1/1995 | (WO) . |

* cited by examiner

*Primary Examiner*—David A. Reifsnyder
(74) *Attorney, Agent, or Firm*—Leydig, Voit & Mayer, Ltd.

(57) ABSTRACT

A method of making a dynamic swirl filter assembly comprises disposing a stack of filter elements within a rotatable wall, wherein the rotatable wall is substantially free of structure which extends substantially across a surface of the filter elements.

31 Claims, 11 Drawing Sheets

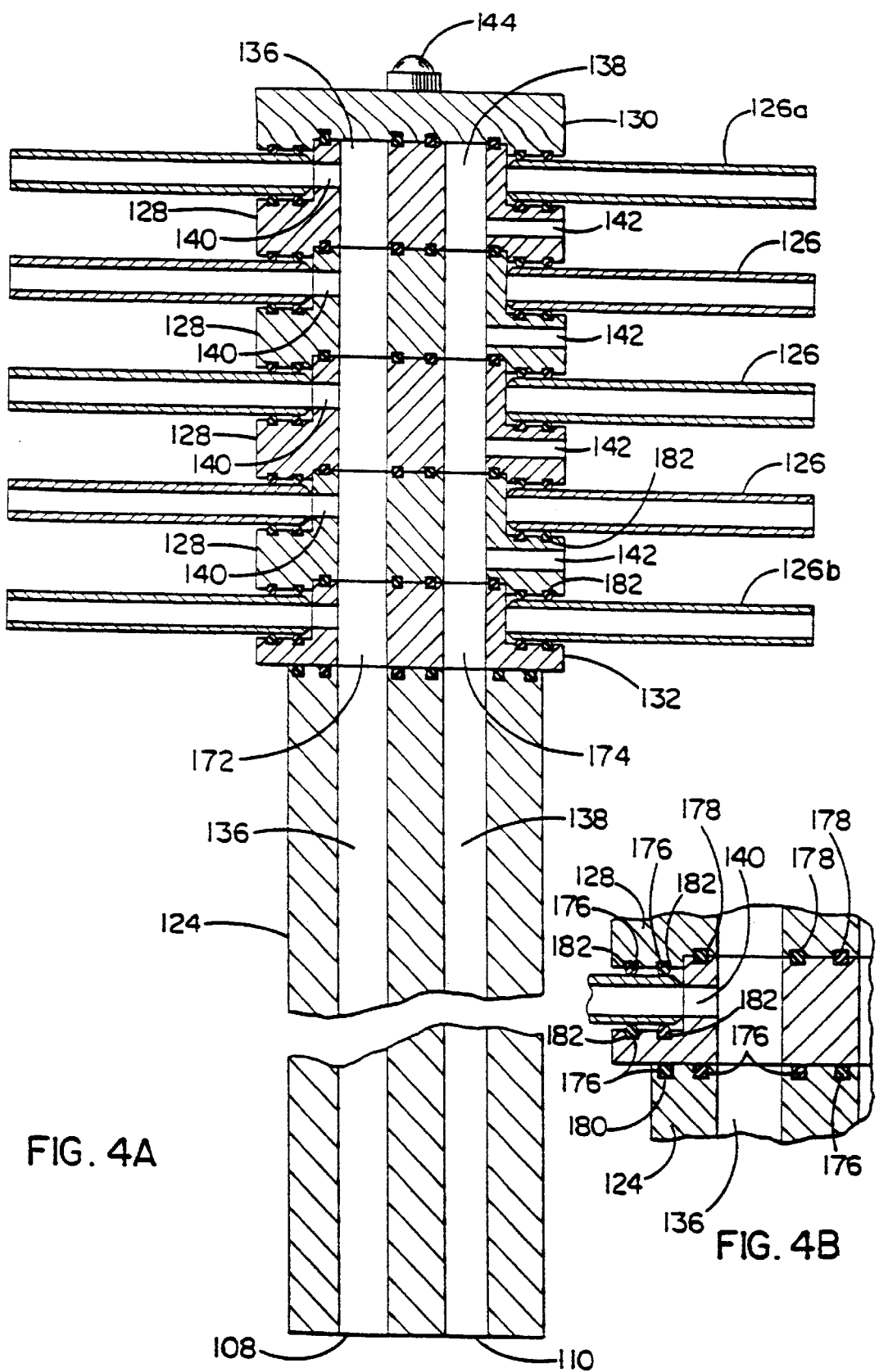

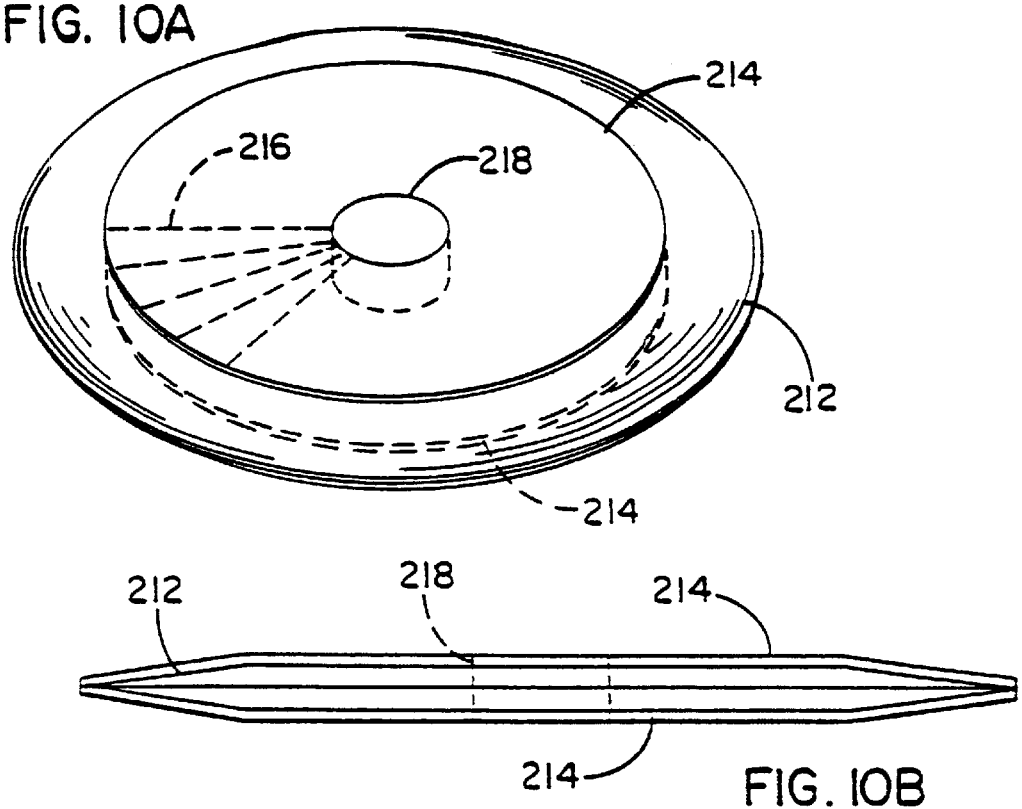
FIG. 10A
FIG. 10B
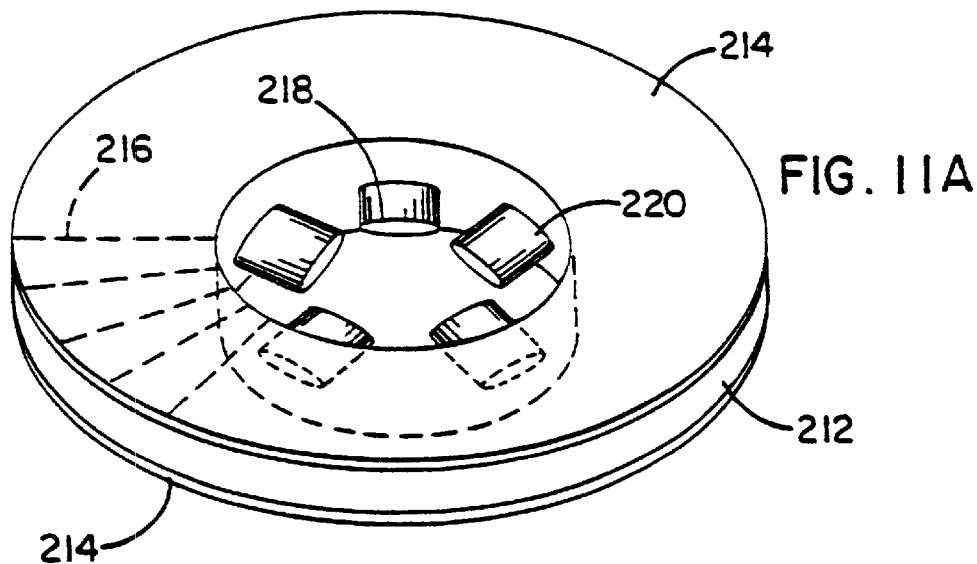
FIG. 11A
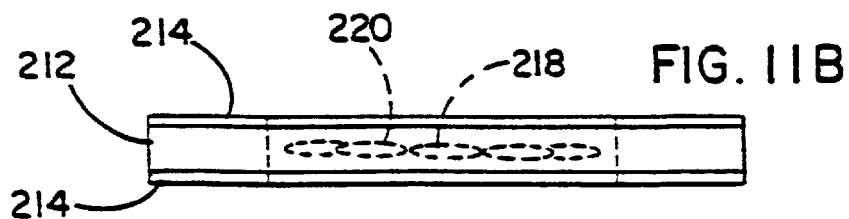
FIG. 11B

METHODS FOR MAKING DYNAMIC FILTER ASSEMBLIES

This application is a divisional of U.S. application Ser. No. 09/051,354, now U.S. Pat. No. 6,168,724 which is the United States National Phase of International Application No. PCT/US96/15782 filed on Oct. 9, 1996, which claimed priority based on U.S. application Ser. No. 60/022,161 filed on Jul. 19, 1996 and U.S. application Ser. No. 60/004,971 filed on Oct. 10, 1995, all of which are incorporated by reference herein.

BACKGROUND OF THE INVENTION

1. Field of the Invention

The present invention relates to filter assemblies and methods, and more particularly, to a dynamic swirl filter assembly for developing fluid shear boundary layers at the surfaces of the filters by rotating the process fluid and a method for providing enhanced filtration.

2. Discussion of the Prior Art

Filtration devices are utilized to separate one or more components of a fluid from other components. As used herein, the term "fluid" includes liquids and all mixtures of liquids and solids or liquids and gases that behave substantially as liquids. Common processes carried out in such devices include classic filtration, microfiltration, ultrafiltration, reverse osmosis, dialysis, electrodialysis, pervaporation, water splitting, sieving, affinity separation, affinity purification, affinity sorption, chromatography, gel filtration, and bacteriological filtration. As used herein, the term "filtration" includes all of those separation processes as well as any other processes utilizing a filter that separates one or more components of a fluid from the other components of the fluid.

A common problem in virtually all filtration systems is blinding or fouling of the filter, for example, a permeable membrane. Permeate passing through the filter from the fluid layer adjacent to the feed side or upstream portion of the filter leaves a layer of material adjacent to, or on the feed side of the filter having a different composition than that of the bulk process fluid. This layer by virtue of its composition may hinder transport of the components trying to pass through the filter to the permeate side of the filter or may include substances which can bind to the filter and clog its pores, thereby fouling the filter. Accordingly, mass transport through the filter per unit time, i.e., flux, may be reduced and the component separating capability of the filter may be adversely affected.

It is well known that a layer of fluid which is adjacent to the surface of a filter and which is in a state of rapid shear flow parallel to the surface of the filter tends to minimize fouling of the filter by the generation of lift on contaminant matter contained in the process fluid. Basically, the generation of lift on contaminant matter tends to reduce fouling of the filter by maintaining an obstruction free path through the filter. In other words, if little or no contaminant matter is on or near the surface of the filter, the process fluid flows directly into the filter wherein undesirable constituents are removed therefrom. Although the undesirable constituents may eventually foul the filter, the larger constituents in the process fluid, which would tend to foul the filter more quickly, remain suspended in the retentate. Accordingly, filter life is prolonged and permeate flow rate is improved.

Essentially, two categories of technology are currently utilized for developing a shear layer at the surface of a filter, cross flow filter systems and dynamic filter systems. In cross flow systems, high volumes of fluid are driven through passages bounded by the filter surface and possibly the inner surface of the filter housing, thereby creating the necessary shear. Simply stated, process fluid is pumped across the upstream surface of the filter at a velocity high enough to disrupt and back mix the boundary layer.

An inherent weakness common to cross flow filter systems is that a significant pressure drop occurs between the inlet and outlet of the filter system, and any increase in shear rate will be accompanied by an increase in this pressure drop. Specifically, the process fluid entering the filter system is under a great deal of pressure in order to develop high velocities; however, once the process fluid is dispersed across the filter elements comprising the filter system, the pressure sharply decreases. This decrease in pressure across the filter elements causes non-uniformity in transmembrane pressure, i.e., pressure differences between the upstream and downstream sides of the filter elements. Non-uniformity in transmembrane pressure tends to cause fouling of the filter elements in a non-uniform manner. Non-uniform fouling occurs because more contaminants may be deposited in a particular area which is subject to a higher process fluid pressure. Filter longevity and efficiency is reduced because certain areas of the filter elements may become fouled more rapidly than other areas, thereby leading to greater non-uniformity in transmembrane pressure and thus increased preferential fouling. Accordingly, the mechanism, i.e., high shear rate, for improving the performance of the filter results in a by-product, i.e., high pressure drop, which tends to reduce the performance of the filter. In addition, in cross flow filter systems, the high feed rates as compared to the filtration rates requires numerous feed recycles through the system, which are, in many processes, undesirable.

Dynamic filter systems overcome the excessive pressure differential problem associated with cross flow filter systems by supplying power to generate the shear flow through a moving surface rather than a pressure differential. Dynamic filter systems may be constructed in various configurations. Two widely used configurations are cylinder devices and disc devices. Within each of these two configurations, numerous variations in design exist. In cylinder devices, a cylindrical filter element is positioned in a concentric shell or filter housing. The shear layer is created in the gap between the filter element and the shell by spinning either the filter element or the shell about a common axis. The shear rate increases with both angular velocity and filter element radius. Conversely, the shear rate decreases as the gap between the filter element and the shell is increased. Accordingly, cylindrical filtering systems which are highly efficient due to high shear rates must either have small gaps which are difficult to manufacture, or large radii which limits the amount of filter surface area that may be packed within the filter vessel.

In disc devices a set of parallel filter discs interleaved with a set of impermeable discs are aligned along a common axis and positioned within the filter housing. In these devices shear is created by rotating the filter discs, or by rotating the impermeable discs. Disc devices overcome some of the disadvantages of cross flow and cylinder devices, but suffer from complexity of design. A major design difficulty is to provide sufficient mechanical support for the discs without either obstructing the fluid flow paths or making the distances between adjacent discs large. A large distance or gap between the discs is undesirable because it increases the overall size of the device and because it increases the amount of fluid retained on the inlet or upstream side of the filter surface, i.e., increases hold-up volume.

SUMMARY OF THE INVENTION

The dynamic filter assemblies and methods embodying the present invention overcome many of the limitations in the prior art.

In accordance with one aspect of the present invention, a method for making a dynamic swirl filter assembly comprises mounting a plurality of filter elements to form a filter stack and disposing the filter stack within a rotatable wall. The rotatable wall is substantially free of structure which extends substantially across a surface of the filter elements.

A dynamic swirl filter assembly may comprise a housing, a process fluid inlet, a permeate outlet, at least one stationary filter element mounted in the housing, and a rotatable wall mounted around the stationary filter element and defining an axis of rotation. The process fluid inlet directs process fluid into the housing and the permeate outlet directs permeate from the housing. The stationary filter element includes a filter having a first surface communicating with the process fluid inlet and a second surface communicating with the permeate outlet. The first surface of the filter is generally perpendicular to the axis of rotation and the rotatable wall is arranged to rotate the process fluid across the first surface of the filter, thereby creating a shear boundary layer at the first surface of the filter.

A dynamic swirl filter assembly may comprise a housing having a rotatable side wall defining an axis of rotation, a process fluid inlet, a permeate outlet, and a stationary filter stack assembly disposed coaxially within the housing. The process fluid inlet directs process fluid into the housing and the permeate outlet directs permeate from the housing. The stationary filter stack assembly includes a filter stack post and at least one filter element mounted to the filter stack post substantially perpendicular to the axis of rotation of the rotatable side wall. The filter element has at least one filter which communicates on one side with the process fluid inlet and on another side with the permeate outlet. The rotatable side wall imparts an angular momentum to the process fluid creating a shear boundary layer at the surface of the filter.

Many exemplary dynamic swirl filter assemblies comprise a set of disc shaped filter elements stationarily mounted in a stacked, substantially parallel orientation, and the process fluid is rotated past the stationary filter elements by a rotating housing. The shear force necessary to lift particulate and/or colloidal matter, i.e., contaminants, contained within the process fluid off the surfaces of the filter elements is thus provided by the rotating housing, rather than by rotating filter elements or rotating impermeable discs interleaved between the filter elements. Preferably, the rotatable housing comprises a smooth inner surface so that no process fluid becomes trapped or stagnates between any raised structures on the inner surface of the housing. Alternatively, the inner surface of the housing may comprise raised structures for facilitating momentum transfer, as is explained subsequently. The shear is provided at the surfaces of the filter elements by viscous friction which dissipates the angular momentum of the fluid entering the region between any pair of adjacent filter elements.

Exemplary dynamic swirl filter assemblies provide for enhanced fluid filtration through improved permeate flow rate. Enhanced filtration is achieved by preventing solid particulate and/or colloidal matter of a predetermined size contained within the process fluid from being deposited on the filter medium of the filter elements. Accordingly, fouling and/or clogging of the filter medium is greatly reduced, thereby allowing for improved permeate flow rate. Additionally, the useful life of the filter elements may be increased thereby, and longer intervals between cleaning and replacement may be achieved.

Exemplary dynamic swirl filter assemblies utilize a design wherein the filter elements remain stationary and the filter housing rotates to provide the necessary fluid rotation required to generate the shear forces. In having the filter elements remain stationary, the complexity of the design of the dynamic swirl filter assembly may be greatly reduced, and therefore reliability may be increased. Specifically, in having the filter elements mounted on a stationary support, the structural integrity of the entire dynamic swirl filter assembly may be increased. In addition, only a single rotating seal may be necessary to maintain the fluid tight integrity of the dynamic swirl filter assembly, thereby resulting in less wear and tear on the dynamic swirl filter assembly. With reduced wear and tear on the dynamic swirl filter the assembly, the required maintenance period is reduced and less parts will need to be replaced.

BRIEF DESCRIPTION OF THE DRAWINGS

FIGS. 4a and 4c are sectional views of the filter stack assembly of the present invention, and FIGS. 4b and 4d are exploded views of sections of FIGS. 4a and 4c respectively.

FIGS. 10A and 10B are digrammatic representations of a portion of a filter element of the dynamic swirl filter assembly.

FIGS. 11A and 11B are diagrammatic representations of a disc support for the filter element of the dynamic swirl filter assembly.

DESCRIPTION OF THE PREFERRED EMBODIMENTS

Figure 1:
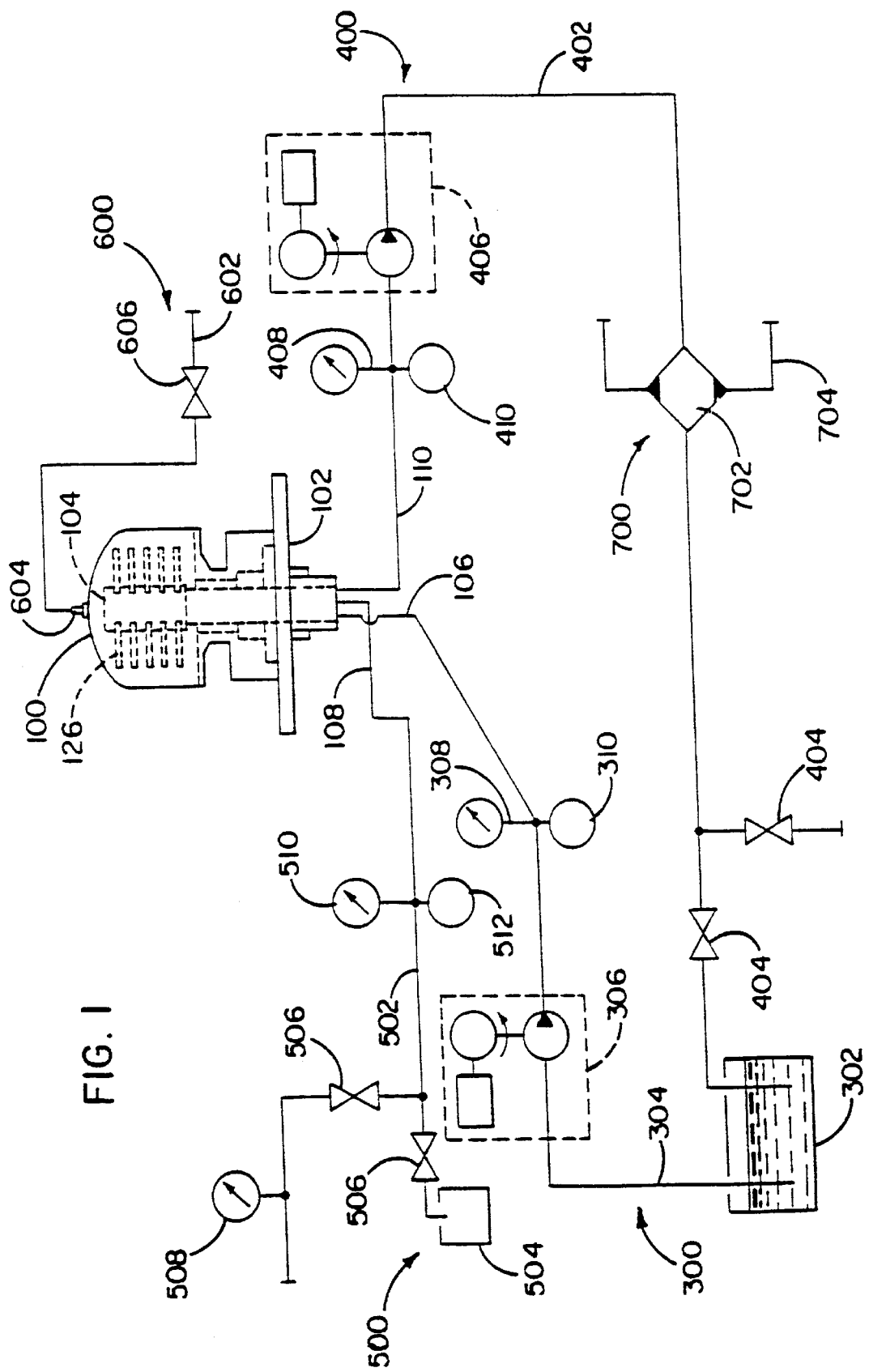
FIG. 1 is a block diagram of a filtration system utilizing the dynamic swirl filter assembly of the present invention.

An exemplary dynamic swirl filter assembly embodying the present invention may comprise a set of disc shaped filter elements stationarily mounted in a stacked, substantially parallel orientation. Each filter element includes a filter medium on at least one surface. In the exemplary dynamic swirl filter assembly, the process fluid is rotated past the stationary filter elements, thereby generating a shear boundary layer, i.e., shear force, at the surface of each filter element. Typically, in assuming flow of this type, the bulk motion of a viscous fluid will be to rotate as a substantially rigid body. In one embodiment, the filter assembly housing is rotated, which causes the process fluid to rotate past the filter elements. Alternatively, the stationary filter elements may be mounted to a stationary housing and a central shaft may be rotated, which also causes the process fluid to rotate past the filter elements. The shear force is provided at the filter surface of each filter element by viscous friction, which dissipates the angular momentum of the rotating process fluid entering the region between any pair of adjacent filter elements. The angular momentum to rotate the process fluid is provided through a similar boundary layer, or shear force, on the rotating housing.

A shear rate, or rate of fluid deformation, across the filter media of the filter elements will generate lift on particulate and/or colloidal matter, i.e., contaminants in the vicinity of the filter medium, thereby keeping contaminant matter contained within the process fluid off the filter medium. Accordingly, fouling and clogging of the filter medium is reduced. The shear rate required to keep particulate and/or colloidal matter off the filter medium is determined by experimentation and depends on a number of factors including fluid viscosity, fluid density, and the size of the particulate and/or colloidal matter. Accordingly, once a desired shear rate is determined, the spin rate necessary to generate this predetermined shear rate is calculated. This may be done in any number of ways, including by an approximate method of balancing the forces applied to the fluid. A brief summary is set forth below describing this simple approximate process of determining the required spin rate. The description of this process is also useful in that it illuminates the means of generating shear by spinning the housing.

There are well known equations for determining fluid shear rate, shear stress, and torque under various fluid flow regimes. These equations may be found in various fluid dynamics texts or handbooks such as *Schlichting's Boundary Layer Theory* (7th Edition 1979, McGraw-Hill Book Company). The determination of the spin rate or rotation rate of the housing that will provide a given lift is typically an iterative process utilizing these well known equations. The first step in the process may be to select an initial value for the angular velocity of the housing. This initial value of angular velocity is then substituted into the equation for shear stress at the filter housing boundary and into the equation for shear stress at the filter element boundary. These two equations involve other variables including the Reynolds number for the given flow regime, the radii of the filter element and the filter housing, and the fluid viscosity and density. The average value of the fluid rotation rate is an unknown quantity to be determined as follows.

As stated above, viscous fluids generally rotate as substantially rigid bodies; consequently, the process fluid may be assumed to spin in a bulk or average motion like a rigid body for purposes of these calculations. A torque is imparted to the fluid through a shear flow boundary layer at the filter housing. It may be assumed that this shear flow boundary layer can be approximated as a flat plate shear flow. A torque opposing this torque is imparted by the stationary filter elements through a shear flow boundary layer at the filter elements, i.e., drag on the spinning fluid caused by the stationary elements. It may be assumed that this shear flow boundary layer can be approximated as a turbulent Von Karman shear flow. Assuming steady-state conditions, i.e., the fluid flow rate is not changing with time, the net torque produced is zero. Accordingly, the torque produced at the filter elements, taking into account the number of filter elements and the distance between the filter elements, may be set equal and opposite to the torque produced at the filter housing in order to obtain a value for the angular velocity of the fluid. This calculated value of angular velocity is substituted into an equation for the shear rate at the filter elements. If this calculated value for the angular velocity does not result in the required shear rate, the above described process is repeated utilizing a new value for the housing's angular velocity.

The above described process of determining shear rate and shear stress relates specifically to the rotating housing embodiment of the invention; however, the general process is equally applicable to the central rotating shaft embodiment. The various values for rotation speeds and torques may be different, but the principal of operation is similar, i.e., a balancing of the torques at both boundaries.

As illustrated in FIG. 1, an exemplary filtration system in which the dynamic swirl filter assembly of the present invention may be utilized may include a dynamic swirl filter assembly 100, a process fluid feed arrangement 300, a retentate recovery arrangement 400, and a permeate recovery arrangement 500. The dynamic swirl filter assembly 100 generally comprises a rotatable filter housing 102, a filter stack assembly 104 having a plurality of filter elements 126, one or more process fluid inlets 106, a permeate outlet 108, and a retentate outlet 110.

The process fluid feed arrangement 300 is connected to the one or more process fluid inlets 106 of the dynamic swirl filter assembly 100 and may include a tank, vat, or other container 302 of process fluid which is coupled to the one or more process fluid inlets 106 via a feed line 304. The process fluid feed arrangement 300 may also include a pump assembly 306 which can comprise a centrifugal pump, or a positive displacement pump, in the feed line 304 for transporting the process fluid from the container 302 to the dynamic swirl filter assembly 100. A pressure sensor 308 and a temperature sensor 310 coupled to the feed line 304 may also be included in the process fluid feed arrangement 300. Alternatively, the process fluid may be supplied from any suitable pressurized source and the process fluid feed arrangement 300 may include, in addition to or instead of the pump assembly 306, one or more control valves and/or flow meters for controlling the flow of process fluid through the feed line 304 to the one or more process fluid inlets 106 of the dynamic swirl filter assembly 100.

The retentate recovery arrangement 400 is coupled to the retentate outlet 110 of the dynamic swirl filter assembly 100. Where the dynamic swirl filter system is a recirculating system and is designed to repeatedly pass the process fluid through the dynamic swirl filter assembly 100, the retentate recovery arrangement 400 may include a retentate return line 402 which extends from the retentate outlet 110 to the process fluid container 302. Where the dynamic swirl filter system is designed to pass the process only once through the dynamic swirl filter assembly 100, valves 404 may be coupled to the retentate return line 402 to direct the retentate to a separate retentate container, not shown, or away from the dynamic swirl filter system. The retentate recovery arrangement 400 may also include a pump assembly 406 which can include a centrifugal pump or a positive displacement pump for transporting the retentate from the dynamic swirl filter assembly 100 to the process fluid container 302. Alternatively, the retentate recovery arrangement 400 may include, in addition to or instead of the pump assembly 406, one or more control valves and flow meters coupled to the retentate return line 402 for transporting the retentate fluid from the dynamic swirl filter assembly 100 to the process fluid container 302. A pressure sensor 408 and a temperature sensor 410 coupled to the retentate return line 402 may also be included in the retentate recovery arrangement 400.

The permeate recovery arrangement 500 is coupled to the permeate outlet 108 of the dynamic swirl filter assembly 100 and may include a permeate recovery line 502 which extends from the permeate outlet 108 to a permeate container 504. One or more valves 506 may be coupled to the permeate recovery line 502 to direct the permeate away from the dynamic swirl filter assembly. Further, pressure sensors 508, 510 and a temperature sensor 512 coupled to the permeate recovery line 502 may also be included in the permeate recovery arrangement 500. Alternatively, the permeate recovery arrangement 500 may include a pump assembly coupled to the permeate recovery line 502 for withdrawing permeate from the dynamic swirl filter assembly 100.

The dynamic filter system may include various other subsystems such as a sterilization and/or cleaning arrangement 600, a heat exchange arrangement 700, and a transport apparatus. The sterilization and/or cleaning arrangement 600 may include a steam line 602 coupled to a steam inlet 604 of the dynamic swirl filter assembly 100 through a valve 606. Steam may be directed through the steam line 602 into the dynamic swirl filter assembly 100 and out through the one or more process fluid inlets 106, the retentate outlet 110, and the permeate outlet 108 to clean and sterilize the dynamic swirl filter assembly 100. The steam line 602 may also be connected into the one or more process fluid inlets 106, the retentate outlet 110 and/or the permeate outlet 108. Alternatively, or in addition, a separate cleaning solution, such as a caustic solution, may be introduced into the dynamic swirl filter assembly 100 through the one or more process fluid inlets 106, exiting through both the retentate outlet 110 and the permeate outlet 108.

The heat exchange arrangement 700 may be coupled to any or all of the process fluid feed line 304, the retentate return line 402, and the permeate recovery line 502 to maintain the temperature of the process fluid, the retentate, or the permeate within a predetermined range. For example, the heat exchange arrangement 700 may include a heat exchanger 702 mounted to the retentate recovery line 402 and supplied with a coolant through a coolant line 704 for maintaining the temperature of the retentate within a predetermined range.

The transport apparatus, not shown, may comprise a skid or a cart in which some or all of the components of the dynamic filter system are mounted to facilitate transport of the system.

Figure 2A:
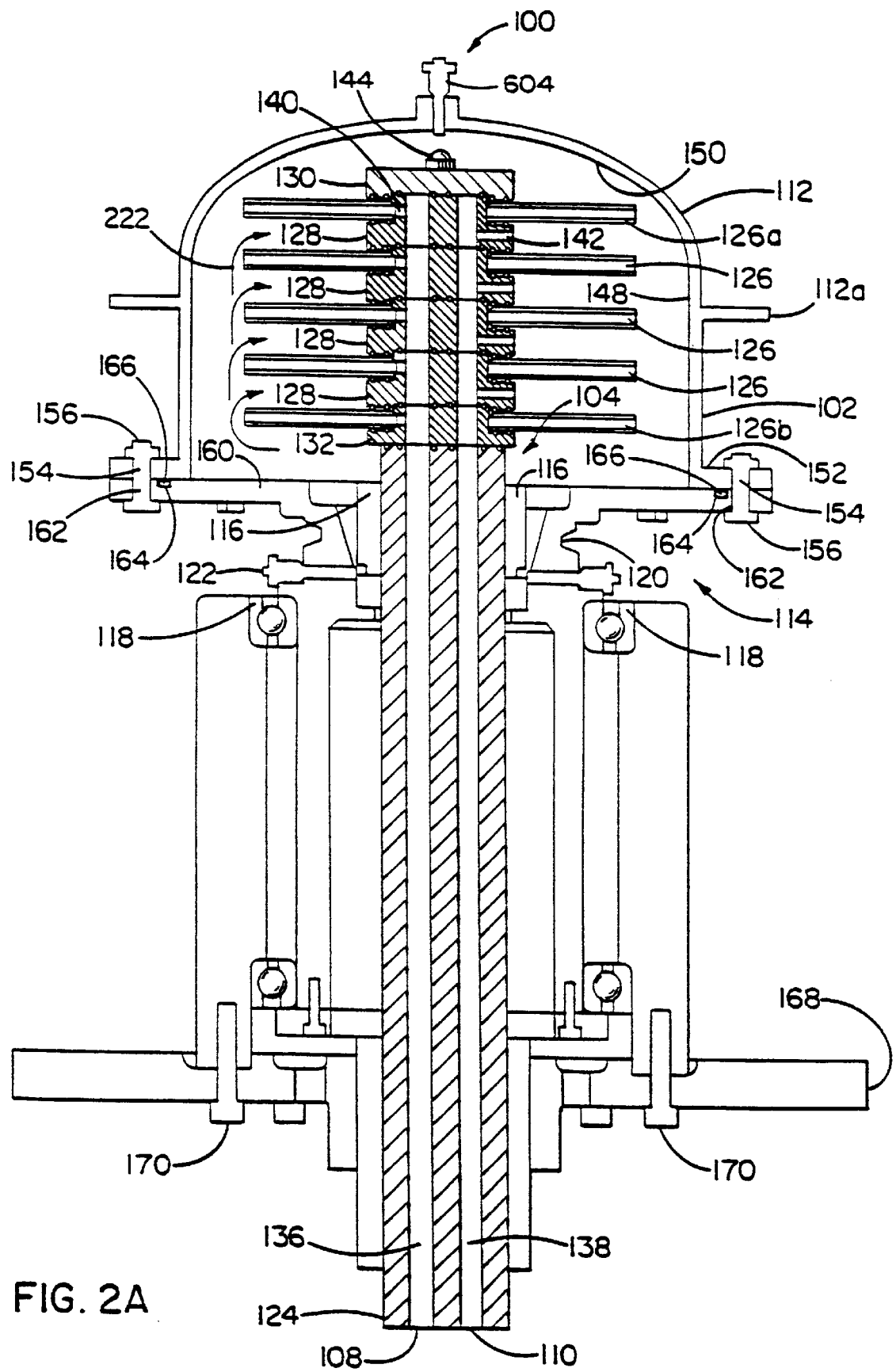
FIGS. 2a and 2b are sectional views of the dynamic swirl filter assembly of the present invention.
Figure 2B:
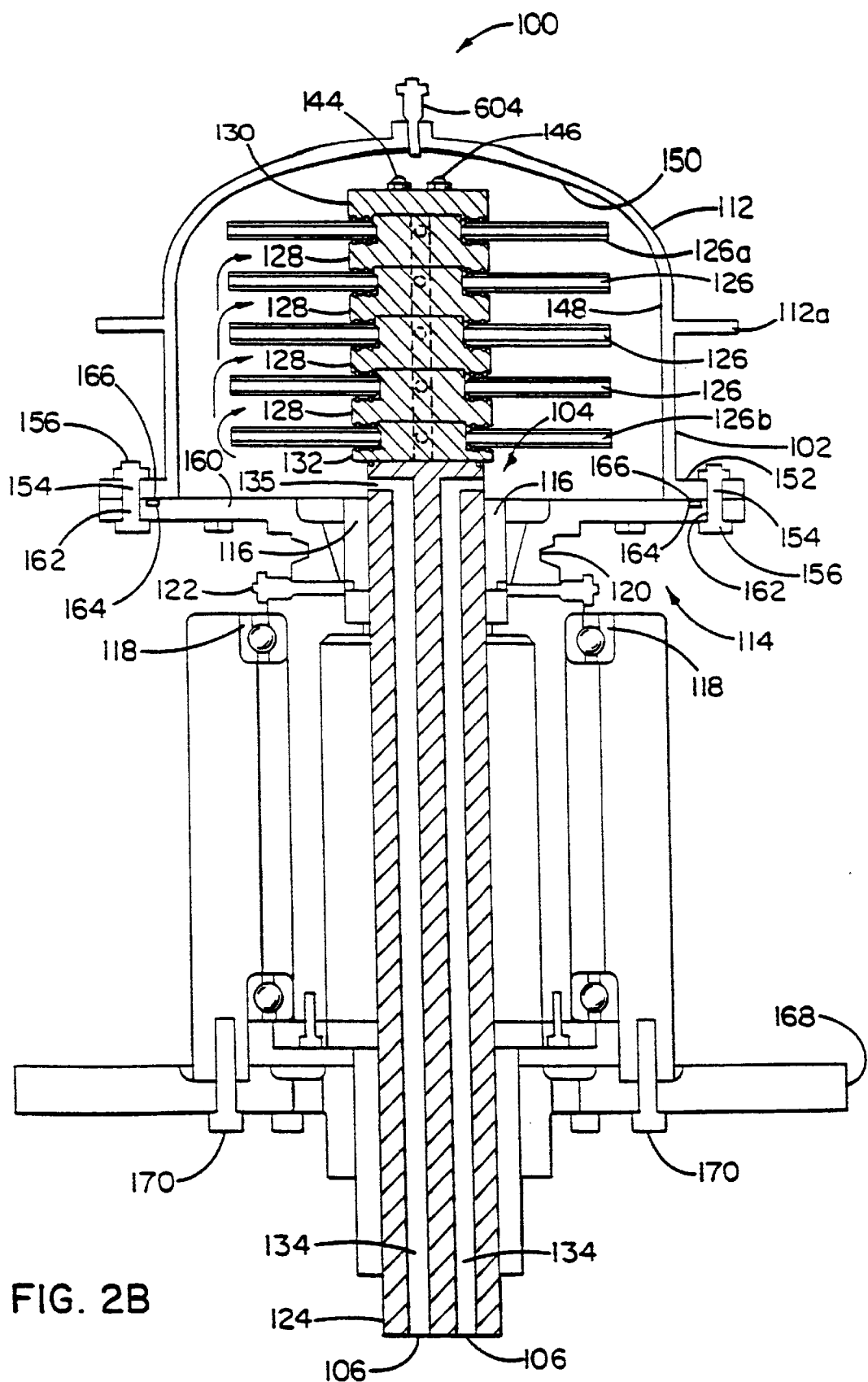

FIGS. 2a and 2b are sectional views illustrating an exemplary embodiment of the dynamic swirl filter assembly 100 of the present invention. The exemplary dynamic swirl filter assembly 100 comprises the rotatable filter housing 102 and the stationary filter stack assembly 104, including the plurality of filter elements 126 mounted on a filter stack base 124. The stationary filter stack assembly 104 may be disposed within the rotatable filter housing 102 such that the rotatable filter housing 102 imparts a predetermined angular momentum to the process fluid, thereby creating a shear layer boundary at the surfaces of the plurality of filter elements 126. The process fluid may be introduced to the dynamic swirl filter assembly 100 through the one or more process fluid inlets 106 coupled to the filter stack assembly 104. The dynamic swirl filter assembly 100 may be a dead end filter system, wherein only permeate is removed, or it may be an open filter system, wherein both permeate and retentate are removed. Permeate and/or retentate may be removed from the dynamic swirl filter assembly 100 through the permeate outlet 108 and the retentate outlet 110, respectively. The permeate outlet 108 and the retentate outlet 110 may also be coupled to the filter stack assembly 104.

The rotatable filter housing 102 generally comprises a housing cover 112 and a housing base 114. The housing cover 112 may be constructed in a variety of configurations. For example, the housing cover 112 may have a substantially cylindrical configuration which may be contoured to the filter stack assembly 104 in order to minimize fluid hold-up volume or not contoured to the filter stack assembly 104 to facilitate various sealing arrangements. In the exemplary embodiment, the housing cover 112 comprises a substantially cylindrical wall 148, a dome shaped upper portion 150, and an annular flange 152. The substantially cylindrical wall 148 is positioned opposed to the edges of the plurality of filter elements 126. The annular flange 152 includes a plurality of through-holes 154 through which bolts 156 or other securing devices are positioned to facilitate mounting the housing cover 112 to the housing base 114. In addition, the annular flange 152 may also be utilized to dynamically balance the rotating components of the dynamic swirl filter assembly 100. Dynamic balancing is generally accomplished by changing the mass distribution of a rotating object on two planes perpendicular to the axis of rotation. Dynamic balancing of the rotating assembly of the present invention may be accomplished by adding weights to, or removing material from the flange 152. Preferably, the dynamic balancing may be accomplished by adding weights to, or removing material from, both the flange 152 and a second flange 112a, provided for this purpose near the top of the housing cover 112. Weights may be added to the flanges 152, 112a by any available means, for example, by welding. Weight may be removed from the flanges 152, 112a by any suitable means, for example, by removing sections of the flanges 152, 112a.

In the exemplary embodiment, the substantially cylindrical wall 148 has a substantially smooth inner surface, i.e., no protrusions, so that no process fluid becomes trapped or stagnates between any protruding structures on the inner surface. Stagnant process fluid may allow bacterial growth or prevent effective cleaning of the filtration system. In addition, as discussed previously, the dynamic swirl filter assembly 100 may comprise a steam port 604. The steam port 604 may be mounted to the dome shaped upper portion 150 of the housing cover 112 for cleaning the dynamic swirl filter assembly 100. The steam port 604 may be connected to the sterilization and/or cleaning arrangement 600 (illustrated in FIG. 1) via a conduit 602. The steam port 604 may be used as a primary cleaning port or as an alternate cleaning port. As discussed above with respect to FIG. 1, the sterilization and/or cleaning arrangement 600 may also be connected to the one or more process fluid inlets 106, the permeate outlet 108, and/or the retentate outlet 110.

The dimensions of the housing cover 112 are such that the filter stack assembly 104 may be placed within the housing cover 112 with the central axis of the filter stack assembly 104 coincident with the central axis of the housing cover 112. Preferably, a small gap exits between the outer edge of the filter elements 126 and the wall 148 of the housing cover 112. If the gap between the edges of the filter elements 126 and the housing cover 112 is too great, excessively turbulent fluid flow may result, thereby degrading filter performance. The gap width may range from about one-quarter (¼) of the radius of the filter elements 126 to as small as manufacturing methods will allow. Preferably, the gap width should be less than or equal to one-tenth (1/10) of the radius of the filter elements 126.

The housing cover 112 may be formed from any suitable material which is rigid and strong enough to withstand the forces generated by rotation. In addition, the material should preferably be impervious to fluid flow and should not react with the particular process fluid. Accordingly, the housing cover 112 may be formed from metallic materials or a polymeric material, and preferably the housing cover 112 may be formed from stainless steel. In addition, as is usual for rotating equipment, a protective shell or cage (not illustrated) may be placed around all rotating parts of the dynamic swirl filter assembly 100 to prevent injury in case of mechanical failure as may be caused by improper operation or other accident.

Figure 3:
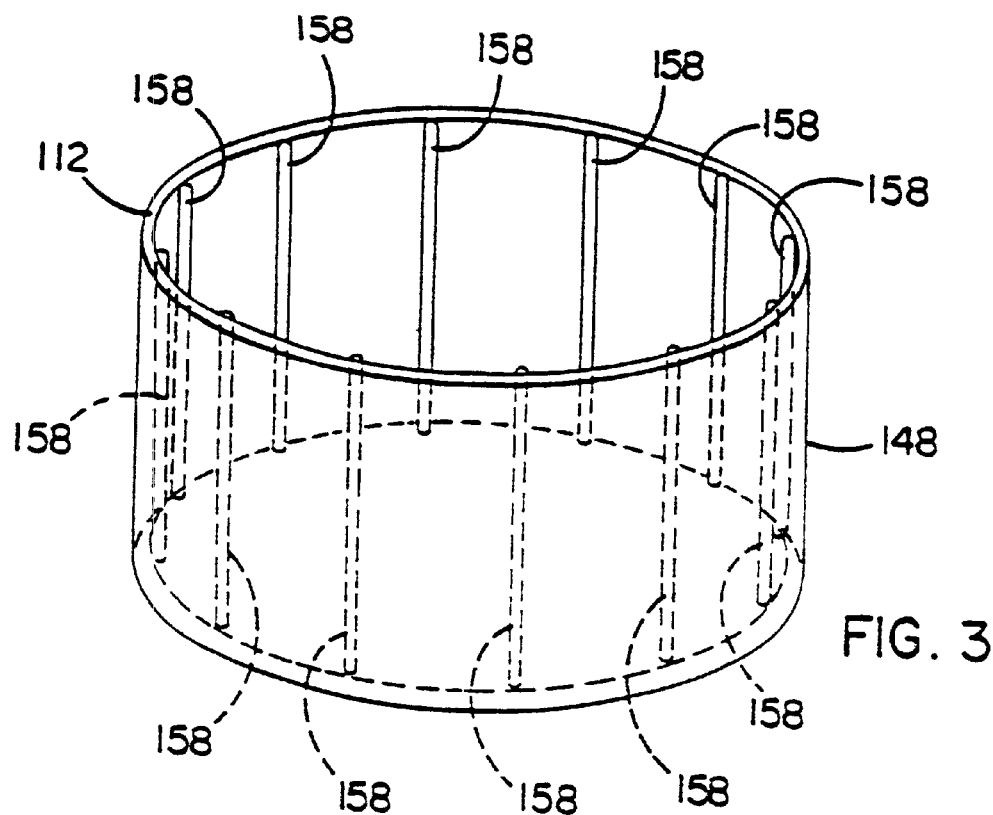
FIG. 3 is a diagrammatic representation of an alternative embodiment of a filter housing cover of the dynamic swirl filter assembly.

FIG. 3 illustrates an alternative embodiment of a portion of the housing cover 112. In this alternative embodiment, the substantially cylindrical wall 148 comprises vanes 158 which extend inwardly from the cylindrical wall 148. For example, in the illustrated embodiment, the vanes 158 are straight and extend perpendicular to the inner surface of the wall 148. Alternatively, the vanes may be curved in either the axial or radial direction and may extend on an acute angle to the wall. The raised vanes 158 may aid in imparting an angular momentum to the process fluid by carrying a substantial volume of process fluid at the angular velocity of the housing cover 112. The resulting angular momentum may be transported towards the filter elements 126 by the radially inward motion of the process fluid required for any nonzero permeate and/or retentate flow. This transport of angular momentum may in turn increase the average angular velocity of the bulk of the swirling fluid flow and thus increase the shear rate at the surfaces of the filter elements 126. The effectiveness of this additional angular momentum will depend strongly on the rate of radially inward flow required for any specific filtration application of the dynamic swirl assembly 100.

The raised vanes 158 may extend the entire axial length of the wall 148 of the housing cover 112, or they may instead be formed in various patterns to vary the amount of process fluid entering between selected pairs of adjacent filter elements 126. However, the rotating cylindrical wall 148 of the housing 102, whether vaned or smooth, is preferably free of any structure, such as radially inwardly extending annular plates or radial protrusions, which extend across the surfaces of the filters of any two adjacent filter elements. In a most preferred embodiment, as illustrated in FIGS. 2a and 2b, the substantially cylindrical wall 148 comprises a substantially smooth inner surface. As stated above, the viscous friction between the process fluid and the wall 148 of the housing cover 112 is sufficient to impart a torque to the process fluid. A smooth surface is preferable because substantially no stagnant areas of fluid may form on a smooth surface, thus reducing cleaning difficulties.

Referring back to FIGS. 2a and 2b the housing cover 112 is connected to and supported by the housing base 114. The exemplary housing base 114 preferably comprises a rotating seal 116, a bearing assembly 118, a drive belt pulley 120, and one or more process fluid drains 122. In addition, the housing base 114 preferably comprises a base plate 160. The base plate 160 may be a substantially annular structure having a central opening through which the filter stack base 124 is positioned. The base plate 160 comprises a plurality of through-holes 162 through which bolts 156 or other securing devices are positioned. The housing cover 112 may be secured to the base plate 160 via the bolts 156, or any other suitable securing means. The base plate 160 also comprises an annular groove 164 in an upper surface thereof. A sealing member 166, for example, an O-ring, may be placed within the annular groove 164 to ensure a fluid-tight seal between the housing cover 112 and the housing base 114 when the housing cover 112 is secured to the base plate 160. The housing base 114 may be formed from the same material as the housing cover 112. Alternatively, the rotatable filter housing 102 may be formed as a single, integral unit.

The rotating seal 116 may be a single or double face seal which is disposed within the central opening of the base plate 160. The face seal 116 defines an opening, having a diameter slightly larger than the diameter of the filter stack base 124, through which the filter stack base 124 is positioned. The face seal 116 provides a dynamic seal between the rotatable filter housing 102 and the stationary filter stack assembly 104. Accordingly, the filter housing 102 is able to freely rotate around the stationary filter stack assembly 104. A single rotating seal 116 may be used in processes where a small amount of process fluid leakage is allowable. The minimal amount of process fluid which does seep through the gap between the face seal 116 and the filter stack base 124 may pass through a series of openings in the housing base 114. The process fluid which seeps through the seal may be collected by means not illustrated for reuse or may be disposed of in accordance with all applicable guidelines concerning the particular fluid. As is standard practice in the fluid processing industry, if the process is such that it is not allowable for process fluid to pass in any amount, e.g., hazardous material, a double face seal may be utilized. The rotating seal 116 may be formed from any material which is impervious to fluid flow and which allows for smooth rotation, such as silicon carbide or graphite. Preferably, the rotating seal 116 may be formed from either silicon carbide or silicon nitride.

Alternatively, if the dynamic swirl filter assembly of the present invention is to be utilized in slow rotation, low pressure applications, or in applications where substantial fluid leakage is acceptable, a simple seal may be utilized instead of the face seal 116. For example, a lip seal may be sufficient in these particular applications.

The housing base 114 may be mounted to a lower assembly support structure 168 by any suitable means such as bolts 170 or tie rods. The bearing assembly 118 may be mounted to the housing base 114 such that it may be interposed between the lower assembly support structure 168 and the housing base 114. The bearing assembly 118 provides for smooth and stable rotation of the rotatable filter housing 102 around the filter stack assembly 104. The rotatable filter housing 102 may be rotated by means of a drive motor, not illustrated. A drive belt or chain may be utilized to connect the drive motor to the housing base 114. The drive belt or chain may be secured to the housing base 114 via the drive belt pulley 120. In the illustrated embodiment, a drive belt is utilized. If a drive chain were to be used, sprockets would be used instead of the drive belt pulley 120. Alternatively, the filter housing 102 may be directly driven by the motor, e.g., a drive shaft and associated gearing may be utilized to couple the motor to the filter housing 102. However, a direct drive system may typically be more complex than a belt or chain drive. Accordingly, in the preferred embodiment, a belt drive is utilized.

In an alternative embodiment, the filter housing 102 may be mounted between an upper assembly support structure (not illustrated) and the lower assembly support structure 168. Accordingly, the filter housing may include a second bearing assembly mounted to the upper assembly support structure. In either embodiment, only a single rotating seal 116 is preferred.

Figures 4C, 4D:
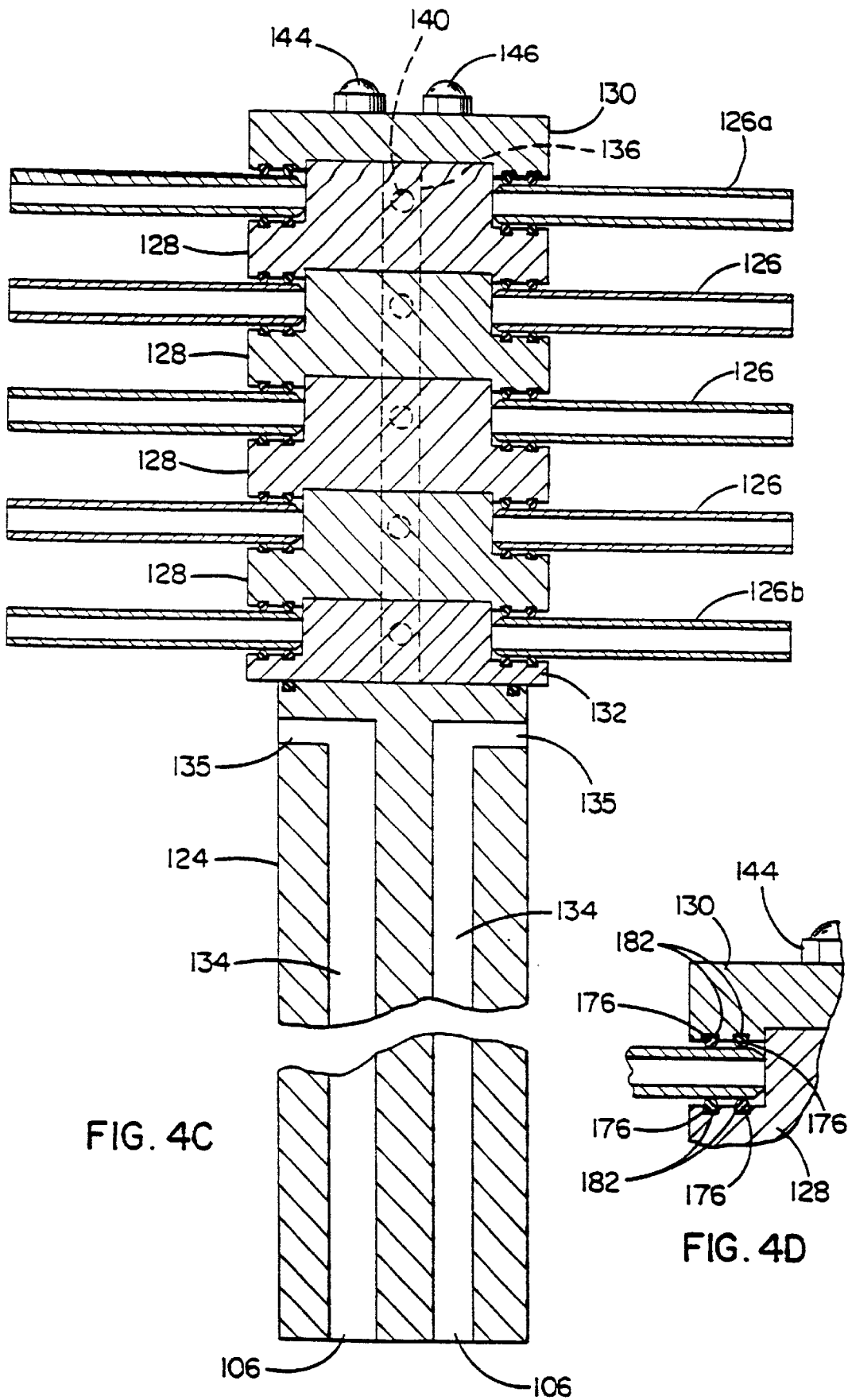

FIGS. 4a and 4c are detailed sectional views of the filter stack assembly 104 and FIGS. 4b and 4d are exploded views of sections of FIGS. 4a and 4c, respectively. The filter stack assembly 104 comprises a lower section and an upper section. The lower section includes the filter stack base 124, process fluid conduits 134, a portion of a permeate conduit 136, and a portion of a retentate conduit 138. The upper section includes the plurality of filter elements 126, a plurality of spacer discs 128, a spacer disc cap 130, a spacer disc base 132, and the remaining portions of the permeate and retentate conduits 136 and 138 respectively. The filter stack assembly 104 is mounted within the housing 102 such that the entire upper section and a portion of the lower section are within the volume defined by the housing cover 112 and the housing base 114, and the remaining portion of the lower section is within the volume defined by the housing base 114, as illustrated in FIGS. 2a and 2b.

The filter stack base 124 may have a substantially cylindrical configuration with a diameter slightly smaller than the rotating seal 116 illustrated in FIGS. 2a and 2b. The exemplary filter stack base 124 may be constructed from any suitably rigid, non-permeable material capable of supporting the filter elements 126 in the rotating fluid, and which will not react with the process fluid. For example, the filter stack base 124 may comprise a polymeric material such as nylon or polysulfone or a metallic material, such as stainless steel. Preferably, for durability and cleanability, the filter stack base 124 comprises stainless steel. The exemplary filter stack base 124 further comprises threaded bores (not illustrated) running axially therethrough. Bolts 144 and 146, tie rods or other suitable securing devices may be utilized to secure the filter elements 126, the spacer discs 128, the spacer disc cap 130 and the spacer disc base 132 to the filter stack base 124. The bolts 144 and 146 are threaded into these threaded bores.

The upper portion of the filter stack assembly 104 comprises the plurality of spacer discs 128 interposed between the plurality of filter elements 126. The spacer disc base 132 may be mounted directly on top of the upper surface of the filter stack base 124. Next, a lowermost filter element 126b may be mounted on top of the spacer disc base 132. Thereafter, alternating spacer discs 128 and filter elements 126 may be sequentially mounted thereon. The spacer disc cap 130 may be mounted above the uppermost filter element 126a to complete the upper portion of the filter stack assembly 104.

In the exemplary embodiment, the filter stack base 124, the plurality of spacer discs 128, the spacer disc base 132 and the spacer disc cap 130 comprise a filter stack post upon which the plurality of filter elements 126 are mounted. As stated above, these various components are secured together by bolts 144 and 146.

Alternatively, the filter stack post may comprise a single, integral unit. In addition, the filter stack assembly 104 may be designed as an inexpensive disposable unit which may simply be discarded after use.

The process fluid conduits 134 may extend from the lower portion of the filter stack base 124 to a position proximate the upper portion of the filter stack base 124. The process fluid conduits 134 may be eccentrically positioned, axially oriented bores in the filter stack base 124 which communicate with and are connected at first ends to the one or more process fluid inlets 106, and which communicate with and are connected at second ends to process fluid channels 135 as illustrated in FIGS. 2b and 4b. Alternatively, the process fluid conduits 134 may comprise tubes or pipes which are positioned within the bores in the filter stack base 124. The process fluid channels 135 may comprise radially oriented bores extending from the outer surface of the filter stack base 124 to the process fluid conduits 134. As illustrated in FIG. 2b, the filter stack assembly 104 may be disposed in the rotatable filter housing 102 such that the process fluid outlet channels 135 communicate with the interior volume of the housing cover 112 for the delivery of process fluid.

The permeate and retentate conduits 136 and 138 may extend almost entirely through the filter stack assembly 104. The lower sections of the permeate and retentate conduits 136 and 138 may be eccentrically positioned, axially oriented bores in the filter stack base 124, and the upper sections may be formed from eccentrically positioned through-holes 172 and 174 in the spacer discs 128 and the spacer disc base 132 (illustrated in FIGS. 5a, 5b, 6a, 6b, 7a and 7b) as is explained in detail subsequently. Alternatively, the permeate and retentate conduits 136 and 138 may comprise tubes or pipes which are positioned within the bores in the filter stack base 124 and within the through-holes 172 and 174 in the spacer discs 128 and the spacer disc base 132. Static seals 176 may be positioned between the filter stack base 124 and the spacer disc base 132, between the spacer disc base 132 and the lowermost filter element 126b, between adjacent spacer discs 128, between the spacer discs 128 and the filter elements 126, between the uppermost filter element 126a and the spacer disc cap 130, and between the uppermost spacer disc 126 and the spacer disc cap 130. The static seals 176 prevent cross-contamination of the process fluid, the retentate, and the permeate. The static seals 176 may comprise O-rings positioned in annular grooves 178 which surround the through-holes 172 and 174 in the spacer discs 128 and the spacer disc base 132, in the annular grooves 180 which surround the permeate and retentate conduits 136 and 138 in the upper surface of the filter stack base 124, and in the annular grooves 182 in the spacer discs 128, the spacer disc cap 130 and the spacer disc base 132. The annular grooves may be more easily seen in FIGS. 5a, 5b, 6a, 6b, 7a and 7b. Alternatively, the seals may be welds permanently connecting the various elements of the filter stack assembly 100.

The permeate conduit 136 communicates with and is connected at a first end to the permeate outlet 108 and communicates with and is connected at a second end to the permeate channels 140 in the spacer discs 128 and the spacer disc base 132. The permeate preferably flows from the filter elements 126 into the permeate channels 140 and into the permeate conduit 136. The retentate conduit 138 communicates with and is connected at a first end to the retentate outlet 110, and communicates with and is connected at a second end to the retentate channels 142 in the spacer discs 128 and the spacer disc base 132.

Figure 5A:
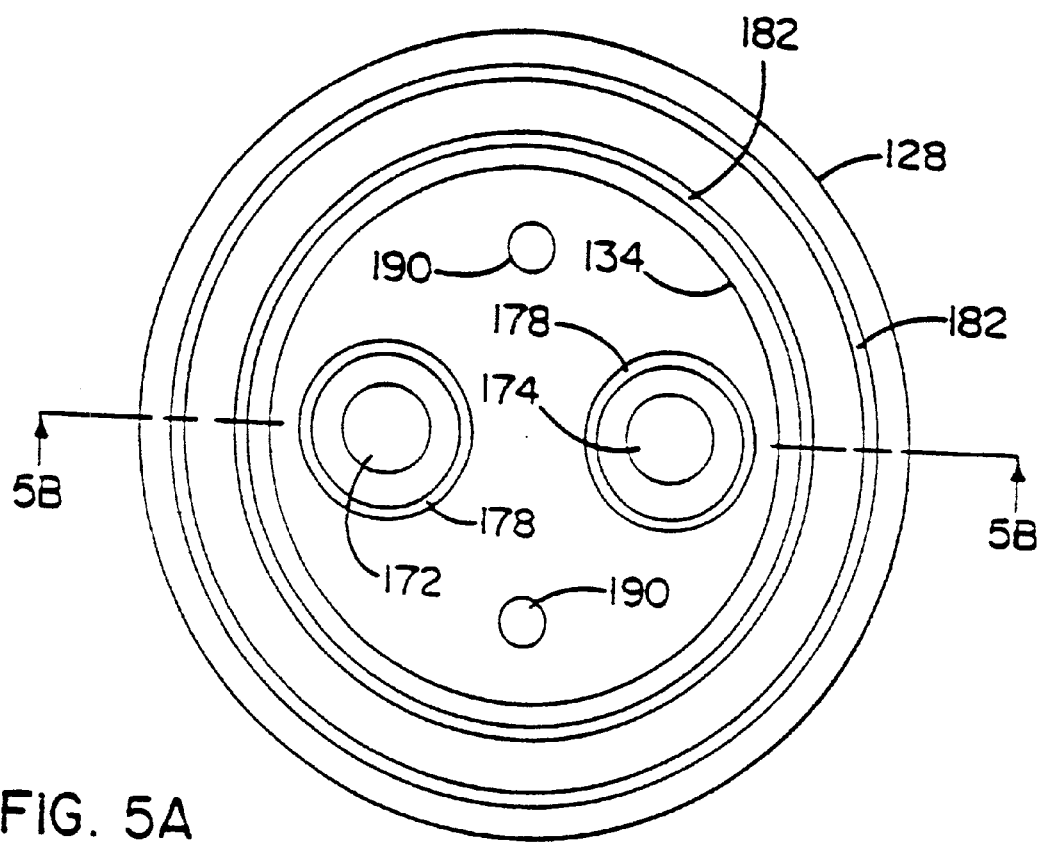
FIG. 5a is a top plan view of a spacer disc of the dynamic swirl filter assembly.
Figure 5B:
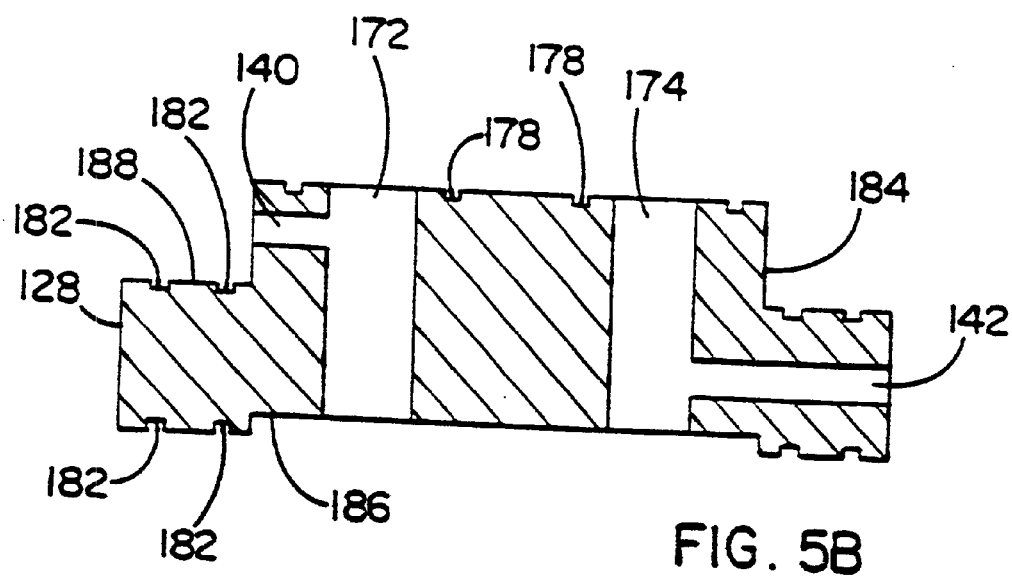
FIG. 5b is a sectional view of the spacer disc illustrated in FIG. 5a taken along section line 1—1.

The spacer discs 128 which may be positioned and secured between adjacent filter elements 126 serve essentially two purposes. First, the spacer discs 128 create a gap between the adjacent filter elements 126 so that the process fluid may flow therethrough. Second, the spacer discs 128 provide mechanical support for the filter elements 126 which are subjected to loads caused by turbulent fluid flow. The spacer discs 128 may be constructed utilizing a variety of configurations. FIGS. 5a and 5b illustrate an exemplary embodiment of a single spacer disc 128. FIG. 5a is a top plan view of the spacer disc 128 and FIG. 5b is a sectional view of the spacer disc 128 taken along section line 5B—5B. All spacer discs 128 may be identical in design. The spacer disc cap 130 and the spacer disc base 132 may be similar in construction and are discussed in detail separately with reference to FIGS. 6a and 6b and FIGS. 7a and 7b respectively.

The spacer discs 128 may be formed from any suitably rigid, non-permeable material which has sufficient structural integrity to support the filter elements 126 and which will not react with the process fluid. Preferably the spacer discs 128 may be formed from metallic or polymeric materials. In having the spacer discs comprise metallic or polymeric materials, the filter elements 126 may comprise a polymeric support structure, thereby reducing the weight of the dynamic swirl filter assembly.

As illustrated in FIGS. 5a and 5b, each spacer disc 128 may be a substantially cylindrical disc with upper and lower parallel major surfaces. A substantially cylindrical protrusion 184 may extend from the upper surface, and a central recess 186 may be formed in the lower surface. The diameter of the central recess 186 may be substantially equal to the diameter of the cylindrical protrusion 184. Thus, adjacent spacer discs 128 may be secured together by positioning the cylindrical protrusion 184 of one spacer disc 128 into the central recess 186 of an adjacent spacer disc 128, enhancing the stability of the filter stack assembly 104. The filter elements 126 may be mounted over the cylindrical protrusion 184 and rest upon a shoulder 188 formed in the region between the cylindrical protrusion 184 and the upper surface of the spacer disc 128. The illustrated spacer disc 128 also comprises the two eccentrically positioned through-holes 172 and 174 which form portions of the permeate and retentate conduits 136 and 138, respectively; the permeate channel 140, which is preferably a radially oriented hole extending between the outer surface of the cylindrical protrusion 184 and the through-hole 172; and the through-holes 190 through which the bolts or tie rods 144 and 146 are positioned. Each spacer disc 128 also includes annular grooves 178 formed in the cylindrical protrusion 184. The annular grooves 178 may be substantially U-shaped grooves formed around the through-holes 172 and 174 to accommodate the O-ring seals 176. Additionally, the two pair of annular grooves 182 are circumferentially arranged around the shoulder 188 and the outer periphery of the lower major surface of the spacer disc 128 respectively. The two pair of annular grooves 182 may be utilized to accommodate the sealing means 176, such as O-rings. The sealing means 176 provide a fluid tight seal between the spacer discs 128 and the filter elements 126 so that retentate may not contaminate the permeate and/or permeate may not contaminate the retentate. The grooves illustrated in the figures are merely for illustrative purposes and are not intended to show relative depths. In the preferred embodiment, the grooves are designed in accordance with the O-ring manufacturer's guidelines. Alternatively, all sealing surfaces of the spacer may be flat, and gaskets utilized to ensure a fluid tight seal. In addition, permanently welded seals may be utilized to provide the fluid tight seal.

The spacer discs 128 may comprise additional through-holes, for example, to accommodate cooling or heating conduits, not illustrated. Under certain circumstances, for example, environmental conditions, or the nature of the fluid, heating or cooling conduits may be desirable to control the temperature of the fluid contained within the dynamic swirl filter assembly 100.

Figure 6A:
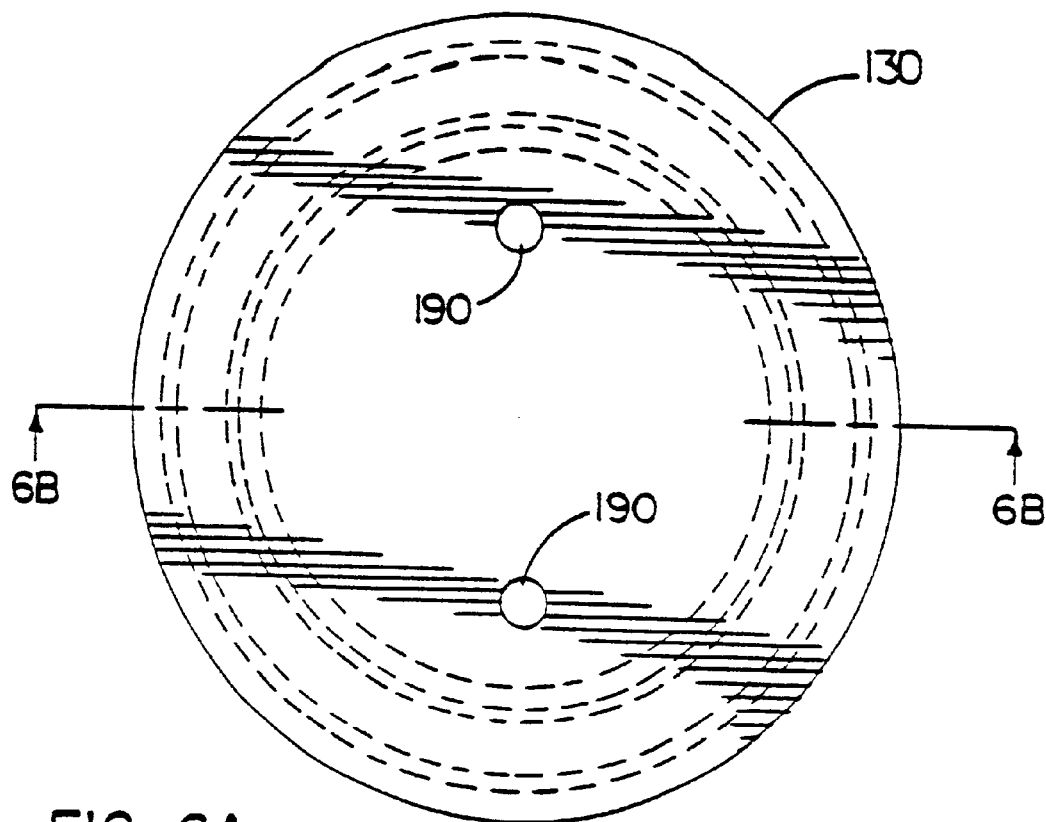
FIG. 6a is a top plan view of a spacer disc cap of the dynamic swirl filter assembly.
Figure 6B:
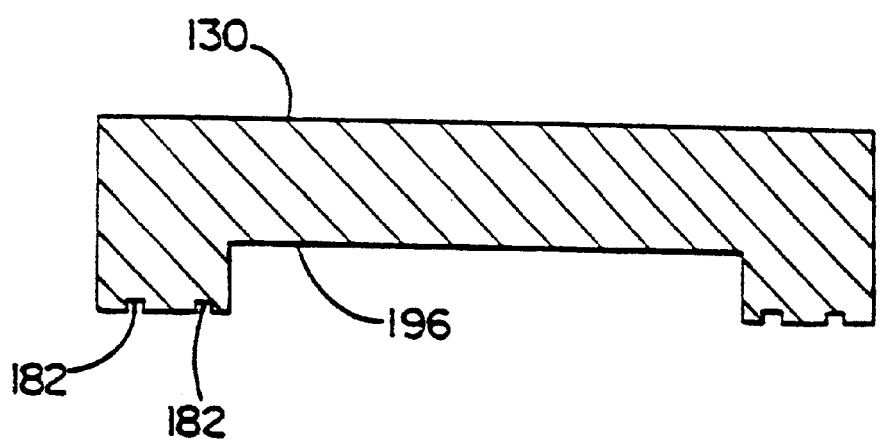
FIG. 6b is a sectional view of the spacer disc cap illustrated in FIG. 6a taken along section line 1—1.

FIGS. 6a and 6b illustrate an exemplary embodiment of the spacer disc cap 130. FIG. 6a is a top plan view of the spacer disc cap 130 and FIG. 6b is a sectional view of the spacer disc cap 130 taken along section line 6B—6B. The spacer disc cap 130 may be a substantially flat cylindrical disc having a central recess 196 and two through-holes 190 through which the bolts or tie rods 144 and 146 are positioned. The central recess 196 has a diameter substantially equal to the diameter of the protrusions 184 of the spacer discs 128 so that the spacer disc cap 130 is tightly secured to the uppermost spacer disc 128. The spacer cap disc 130 preferably does not comprise through-holes for forming part of the permeate and retentate conduits 136 and 138. The spacer disc cap 130 preferably does comprise a pair of annular grooves 182 for mounting sealing means 176, such as O-rings, to provide a fluid tight seal between itself and the uppermost filter element 126. As described above, these grooves 182 are also illustrative in nature. In addition, as with the spacer discs 126, the sealing surface of the spacer disc cap 130 may be flat and utilize a gasket or a permanent welded seal.

Figure 7A:
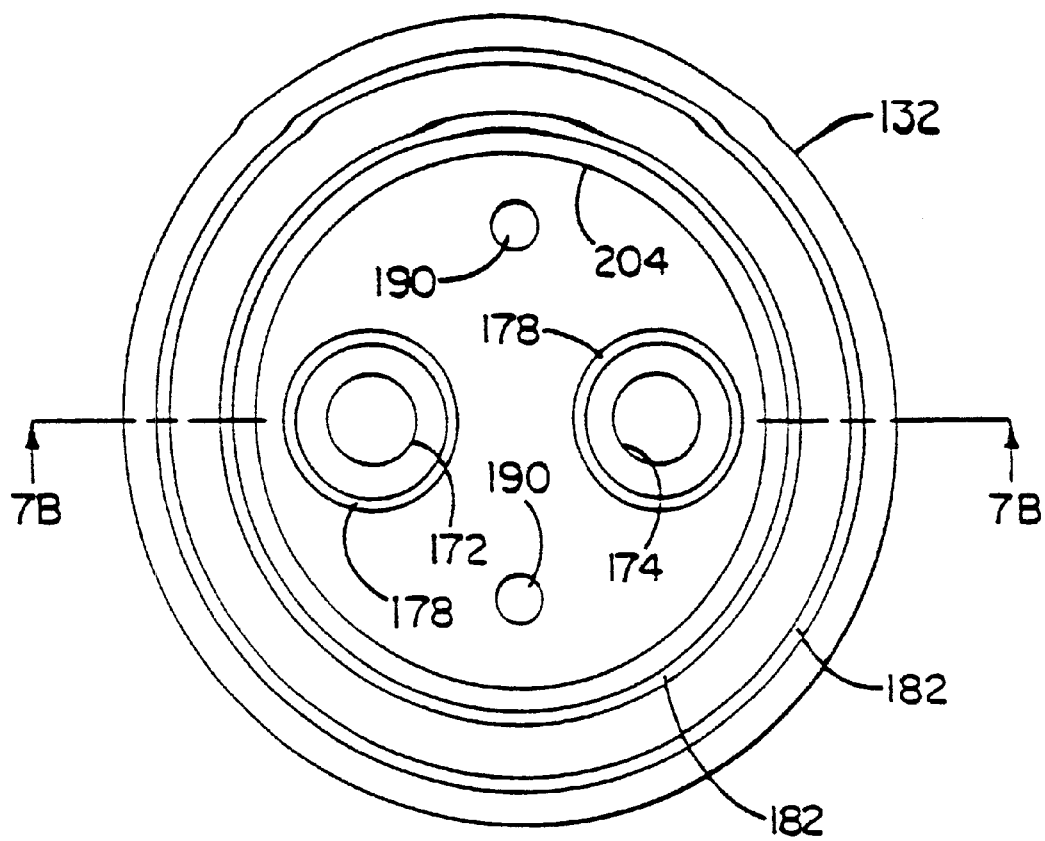
FIG. 7a is a top plan view of a spacer disc base of the dynamic swirl filter assembly.
Figure 7B:
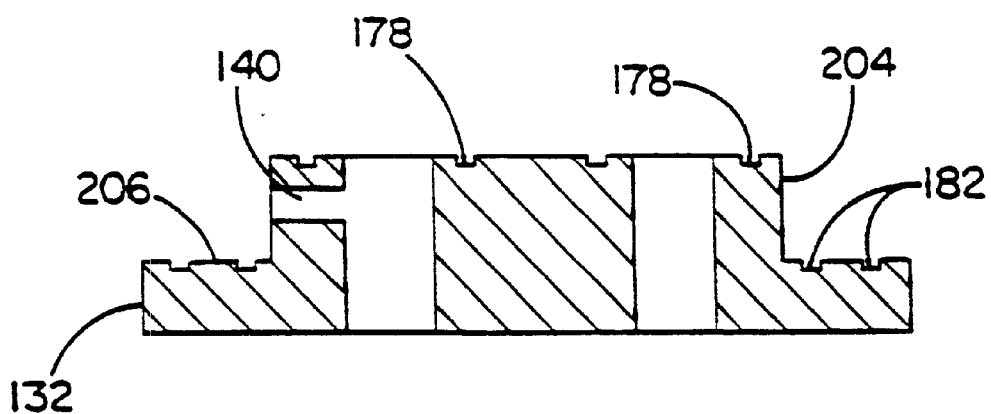
FIG. 7b is a sectional view of the spacer disc base illustrated in FIG. 7a taken along section line 1—1.

FIGS. 7a and 7b illustrate an exemplary embodiment of the spacer disc base 132. FIG. 7a is a top plan view of the spacer disc base 132 and FIG. 7b is a sectional view of the spacer disc base 132 taken along section 7B—7B. The spacer disc base 132 may be a substantially cylindrical disc with upper and lower major parallel surfaces. A substantially cylindrical protrusion 204 may extend from the upper surface. The protrusion 204 may be the same diameter as the protrusions 184 on the spacer discs 128 and fits into the central recess 186 of the lowermost spacer disc 128b. The lowermost filter element 126b is mounted over the coaxial protrusion 204 and rests upon a shoulder 206 formed in the region between the protrusion 204 and the upper surface of the spacer disc base 132. The spacer disc base 132 also comprises the two eccentrically positioned through-holes 172 and 174 which form portions of the permeate and retentate conduits 136 and 138 respectively, the permeate channel 140 which is a radially oriented hole extending between the outer surface of the coaxial protrusion 204 and the through-hole 172, and the through-holes 190 through which the bolts or tie rods 144 and 146 are positioned. The spacer disc base 132 comprises a pair of annular grooves 178 for mounting sealing means 176. The annular grooves 178 may be U-shaped notches formed around the through-holes 172 and 174 to accommodate the O-ring seals 176. Additionally, the spacer disc base 132 comprises two pair of annular grooves 182 for mounting sealing means 176, such as O-rings, to provide a fluid tight seal between itself and the lowermost filter element 126b. As with the spacer disc cap 130 and the spacer discs 126, various sealing arrangements may be utilized.

The spacer disc cap 130 and the spacer disc base 132 may comprise the same material as the spacer discs 128. The spacer discs 128, the spacer disc cap 130 and the spacer disc base 132 may have any suitable dimension and may each be the same size or vary in size. The diameter of each of these structures 128, 130, 132 may be based on a number of factors, including the size of the filter elements 126. Accordingly, the spacer discs 128, the spacer disc cap 130 and the spacer disc base 132 are sized to provide sufficient structural support for the filter elements 126 during dynamic filtration. The thickness of the spacer discs 128 may also vary as a function of the size of the filter elements 126, as is explained in detail below.

All of the filter elements 126 may be identical in design as illustrated in FIGS. 2a and 2b, and the filter elements 126 may be constructed in a variety of ways. For example, the filter elements 126 may be flat or have a generally conical shape. In addition, the filter elements 126 may be of any size, for example, six inches in diameter, twelve inches in diameter, or sixteen to eighteen inches in diameter, depending on the particular application. The size of the filter elements 126 may affect the design and sizing of various other components comprising the dynamic swirl filter assembly 100. For example, the gap between adjacent filter elements 126, i.e., the pitch, depends on various factors including the size of the filter elements 126. If the gap is too narrow, substantially none of the fluid in the gap will swirl with sufficient velocity to generate a shear rate that will produce sufficient lift for the suspension of particulate and/or colloidal matter in the fluid. As the gap width increases, the fluid velocity, shear rate and lift are large enough over a significantly large radial outer region of the gap to retard or prevent fouling of a filter element in this outer region of the gap. The preferred gap width varies, for example, with the size of the filter elements 126. For six inch diameter filter elements the preferred gap is approximately one quarter (¼) inch between adjacent filter elements; for twelve inch diameter filter elements approximately one half (½) inch between adjacent filter elements; and for sixteen to eighteen inch diameter filter elements approximately three quarter (¾) inch between adjacent filter elements.

The spacer discs 128 determine the gap width; accordingly, the thickness of the spacer discs 128 may also vary as a function of the size of the filter elements 126. Of course, gaps larger than the preferred gap width may be utilized. However, if larger gaps are utilized, little or no benefit in terms of increased shear rate penetration may be recognized, while a decrease in available filtration surface may result from fewer filter elements 126 fitting into the rotatable filter housing 102.

The diameter of the spacer discs 128 may also vary as a function of the size of the filter elements 126. For example, as the filter elements 126 increase in diameter, larger diameter spacer discs 128 may be utilized to provide sufficient mechanical support for the filter elements 126. The spacer disc base 132 and the spacer disc cap 130 may be sized accordingly.

The size of the filter elements 126 may also effect the rotational speed of the rotatable filter housing 102. As explained above, once a desired shear rate is determined, the spin rate of the housing 102 to generate this shear rate may be calculated. The spin rate of the housing 102 to generate a specific shear rate varies as a function of various factors, including the size of the filter elements 126. For example, for a six inch diameter filter element, the spin rate of the rotatable filter housing 102 may preferably be in the range from about 2,000 to about 6,000 rpm; for a twelve inch diameter filter element, the spin rate may preferably be in the range from about 1,000 to about 5,000 rpm; and for a sixteen to eighteen inch diameter filter element, the spin rate may preferably be in the range from about 1,000 to about 3,000 rpm.

Figure 8:
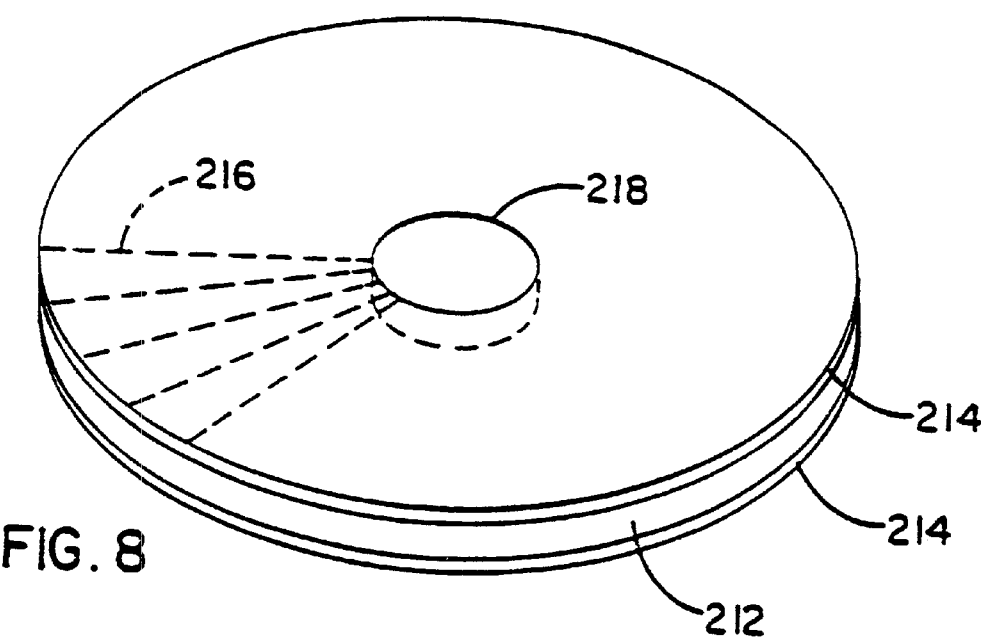
FIG. 8 is a diagrammatic representation of a filter element of the dynamic swirl filter assembly.

An exemplary embodiment of a single filter element 126 is illustrated in FIG. 8. Each filter element may comprise one or more sectors, such as two abutting and/or interlocking D-shaped sectors, each including a sector-shaped support and a filter mounted to one or both surfaces of the sector-shaped support. In the preferred embodiment, the filter elements 126 comprise a flat annular disc support 212 and at least one but preferably two filters 214 mounted on opposite major parallel surfaces of the flat annular disc support 212. The flat annular disc support 212 may comprise any suitably rigid material that provides sufficient structural integrity and which is compatible with the process fluid. For example, the flat annular disc support 212 preferably comprises a structural polymeric material such as nylon or polysulfone. In addition, the flat annular disc support 212 may include reinforcement such as oriented glass fibers dispersed in the polymeric material, or an integral metal support. This reinforcement provides additional structural integrity. It also provides dimensional stability by resisting expansion of the flat annular disc support 212 due to temperature and/or moisture absorption. The flat annular disc support 212 may further include flats on its surfaces and edges to facilitate the mounting of the filters 214. In order that as much as possible of the shear force transmitted to the filter element 126 act on the surface of the filter 214, rather than on the surface of the support disc 212, the edges of the flat annular disc support 212 may have a curved or tapered configuration. The outer radius of the filter 214 should extend as close to the outer radius of the support disc 212 as may be allowed by the manufacturing process. FIG. 10 illustrates a portion of a flat annular disc support 212 having a sharply tapered edge and the filter 214 covering the entire surface. The tapered region is in fact one of the most effective areas for filtration having the highest shear rate. If a conventional square edge is used, this high shear is applied to the outer cylindrical surface of the support disc 212 and not to the filter 214.

Channels 216, such as v-shaped radial grooves or circumferential grooves formed on one or both major parallel surfaces of the annular disc support 212 and/or through-holes extending through the annular disc 212, facilitate the flow of permeate towards the central opening 218 in the flat annular disc support 212. The central opening 218 has a diameter no greater than the diameter of the cylindrical protrusion 184 such that the filter element 126 fits securely around the protrusion 184 of the spacer disc 128 with the channels 216 in the filter element 126 communicating with the permeate channel 140 in the spacer disc 128. The channels 216 in the flat annular disc support 212 may be contoured to minimize back pressure on the filters 214 and balance transmembrane pressure. Alternatively, both major parallel surfaces of the flat annular disc support 212 may be perforated and the interior of the flat annular disc support 212 may be hollow. Accordingly, permeate may flow into the hollow interior region through the perforations and then into the permeate channel 140 in the spacer disc 128.

The two filters 214 of the filter element 126 each include an upstream side which communicates with the process fluid and a downstream side which communicates with the permeate. A filter 214 is mounted to at least one surface and preferably both major surfaces of the flat disc support 212.

Each filter 214 may comprise any suitable filter medium, such as a porous or semipermeable polymeric film or a woven or non-woven sheet of polymeric or non-polymeric fibers or filaments. Alternatively, each filter 214 may comprise a porous metal media, such as available from Pall Corporation under the trade designations PMM and PMF, a fiberglass media, or a porous ceramic media. The size and distribution of the pores and the removal rating of the filter medium may be selected to meet the requirements of any particular application. For the exemplary embodiment the permeable porous membrane may include microporous membranes (e.g., membranes having pore ratings in the approximate range of 0.05 to 10 microns) and ultrafiltration membranes (e.g., membranes having pore ratings in the approximate range of 0.005 to 0.1 micron). The filter medium may be formed from any suitable material and will typically be formed from a polymeric material such as polyamide, polyvinyldisulfide, polyvinylidene fluoride, polytetrafluoroethylene, polyethersulfone, polyethylene, polypropylene, and nylon. The preferred filter medium will depend on the process fluid and the filtration to be performed. Further, each filter 214 may comprise one or more layers. For example, each filter 214 may include a microporous membrane and a porous layer. The porous layer may be disposed adjacent to the microporous membrane for support and/or drainage. The drainage layer, for example, a fibrous material, may be mounted on both major parallel surfaces of the flat annular disc 212 between the disc 212 and the microporous membrane. Accordingly, the filter medium may be mounted to the drainage layers.

The filters 214 may be attached to the flat disc 212 in any suitable manner depending, for example, on the composition of the flat disc 212 and the filters 214. Filters 214 may be welded to the flat discs 212 in a variety of ways or they may be bonded to the flat disc 212 by an adhesive or a solvent. In addition, the filters 214 may be heat sealed to the flat discs 212 by means of a woven polymeric material interposed between the filters 214 and the flat discs 212, the woven polymeric material preferably having a melting temperature lower than either the filters 214 or the flat discs 212. This process is described, for example, in U.S. patent application Ser. No. 08/388,310, assigned to the same assignee as the present invention.

As discussed above, the shear rate may not be high enough in the inner radial regions of the gap between adjacent filter elements to generate sufficient lift to keep particulate and/or colloidal matter suspended in the fluid in the inner radial regions. Accordingly, the penetration distance, e.g., the radially inwardly extending distance from the outer diameter of the filter element through which a sufficient shear rate is maintained, may be approximately one half (½) the radius of the filter element 128. For example, for a six inch diameter filter element, the penetration distance may be about 1.5 inches; for a twelve inch diameter filter element, the penetration distance may be about three (3) inches; and for a sixteen to eighteen inch diameter filter element the penetration distance may range from about four (4) inches to about 4.5 inches.

Since not all of the surface of each filter element 128 is efficient for dynamic filtration, the filters 214 need not be mounted over substantially all of the flat disc 212. For example, since the penetration distance may be approximately one half (½) the radius of the filter element 128, the filters 214 may comprise annularly shaped rings of filter medium having an outside diameter less than or substantially equal to the outside diameter of the flat disc 212 and an inside radius equal to or greater than about one half (½) of the radius of the filter element 128.

In an alternative embodiment, the filter elements 126 may comprise a flat annular disc support 212 having radially oriented spokes in a central region thereof. For example, as illustrated in FIG. 11, the spokes 220 may extend from the central opening 218 to an inner wall at a radial distance corresponding to approximately one half (½) of the radius of the filter element 126. Accordingly, the filters 214 may be mounted to the non-spoked regions of the flat annular disc support 212 thereby providing filtration over the fluid penetration area. The spokes 220 may be aerodynamically designed so that the swirling fluid flow may pass smoothly around the spokes 220, thereby substantially preventing turbulent fluid flow which may interfere with the dynamic filtration at the outer half of the filter elements 126. In utilizing spokes 220 rather than a solid disc, manufacturing costs may be reduced due to savings in material. In addition, the weight of each of the filter elements 126 may be reduced, thereby lowering the weight of the entire assembly 100.

The spokes 220 may be connected to a spacer disc in any suitable manner, e.g., a mechanical connection, a weld, or a bond. At least one of the spokes 220 may be hollow thereby defining a permeate passageway for porting the permeate from the filter element 126 to the permeate channel 140 in the spacer disc or the spacer disc base. Sealing means may be positioned around at least one of the permeate channel 140 or the hollow spoke 220 to ensure a fluid tight seal therebetween. The remaining spokes 220 may be hollow or solid.

As discussed above, the flat annular disc support 212 may have a curved tapered configuration to reduce the effect of frictional losses. Accordingly, this edge may not be an effective area for filtration if the filters 214 were to be mounted up to the edge of the disc support 212. Therefore, the filters 214 may be positioned back from the edge, e.g., at the start of the tapered section as illustrated in FIG. 10.

The filter stack assembly 104 may be assembled in any suitable manner. For example, the spacer disc base 132 may be placed atop the filter stack base 124 and a filter element 126b may be placed over the protrusion 204 and onto the upper surface of the spacer disc base 132. A spacer disc 128 may then be placed atop the spacer disc base 132 with the protrusion 204 of the spacer disc base 132 abutting and nestling into the recess 186 of the spacer disc 128. Filter elements 126 and spacer discs 128 are then alternately stacked with the protrusion 184 of one spacer disc 128 abutting and nestling into the recess 186 of an adjacent spacer disc 128. The spacer disc cap 130 is then placed atop the uppermost filter element 126a and spacer disc 128 with the protrusion 184 of the uppermost spacer disc 128 abutting and nestling into the recess 196 of the spacer disc cap 130. Bolts 144, 146 are finally inserted through the through-holes 190 of the spacer disc elements 130, 128, 132 and tightened into the filter stack base 124 to a desired compression. Each of the filter elements 126 are clamped between the upper and lower surfaces of the spacer disc elements 130, 128, 132. However, the clamping force exerted on the filter elements 128, is preferably limited by the abutting spacer disc elements 130, 128, 132 to a value which securely holds the filter elements 128 in place but reduces the risk that the filter elements 128 will be crushed along the inner periphery.

Referring back to FIGS. 2a and 2b, process fluid enters the dynamic swirl filter assembly 100 through the process fluid inlets 106 at a predetermined pressure. The process fluid may be supplied by the process fluid feed arrangement 300, illustrated in FIG. 1 or from any other source. The process fluid preferably enters the dynamic swirl filter assembly 100 in the space between the lowermost filter element 126b and the housing base 114. Some angular momentum is imparted to the process fluid in this region by the spinning motion of the housing base 114, thereby generating a shear layer on the lower surface of the lowermost filter element 126b. The process fluid which is introduced into the dynamic swirl filter assembly 100 under pressure, swirls generally radially outwardly between the lowermost filter element 126b and the housing base 114, generally axially upwardly between the housing cover 112 and the peripheral edges of the filter elements 126, and generally radially inwardly between the filter elements 126 and the space above the uppermost filter element 126a. The process fluid flows substantially uniformly through the gap between the filter elements 126 and the housing cover 112 as indicated by arrows 222. In this region, the housing cover 112, by means of viscous friction, causes the process fluid to rotate at approximately one-half (½) the angular velocity of the housing cover 112. The rotating fluid, including the fluid between the filter elements, moves radially inward across the surfaces of the filters 214 of the filter elements 126. The angular momentum of the process fluid imparted by the rotating housing 102 ensures that it spins about the central axis of the dynamic swirl assembly, thus maintaining the desired shear layer boundary across the surfaces of the filter elements 126. The space between the adjacent filter elements 126 may be free of any structures which would tend to inhibit the flow of process fluid; accordingly, there is a maximum of relative movement between the spinning process fluid and the stationary filter elements 126, resulting in maximum shear at the filter surfaces 214. The spin rate of the process fluid decreases towards the center of the dynamic swirl filter assembly 100.

The shear generated across the filters 214 generates lift on particulate and/or colloidal matter, i.e., contaminants, contained in the process fluid, thereby tending to prevent fouling and/or clogging of the filters 214. A portion of the process fluid, i.e., the permeate, flows from the upstream portion to the downstream portion of the filters 214. The permeate then travels along the channels 216 in the flat annular disc support 212 of the filter elements 126 towards the central opening 218 of the filter elements 126. The permeate then flows into the permeate channels 140 of the spacer disc elements 128, 132, as indicated by arrows 224. The permeate flows from the permeate channels 140 into the permeate conduit 136 and finally into the permeate recovery arrangement 500.

The remaining portion of the process fluid, i.e., the retentate, is forced by the pressure of the incoming process fluid into the retentate channels 142 of the spacer discs 128, as indicated by arrows 226. The retentate flows through the retentate channels 142 into the retentate conduit 138 and finally into the retentate recovery arrangement 400. The particulate and/or colloidal matter which may be suspended above the surfaces of the filters 214 may be removed with the retentate. Accordingly, much of the particulate and/or colloidal matter which would tend to clog the filters 214 is removed easily during normal filtration. If the dynamic swirl filter assembly 100 is operated with no retentate flow, the filter elements will eventually foul, but the amount of permeate recovered will be substantially greater than in a non-rotating filter assembly of equivalent surface area.

In the embodiment illustrated, all the filter elements 126 comprise two filters 214, i.e., one on each side. However, because the upper surface of the uppermost filter element 126a and the lower surface of the lowermost filter element 126b may experience fluid flow conditions different from all the other filter surfaces, uniformity of permeate conditioning may be improved by making these two surfaces impermeable and not using them for filtration.

Conventional dynamic filtration systems include filter elements or impermeable discs attached to a rotating shaft. The speed of rotation of the filter elements or impermeable discs is limited by the resonant frequency of the rotating shaft and the attached components. Therefore, the shear rate created is limited by the resonant frequency. In addition, the number of filter elements in conventional dynamic filtration systems is limited. Additional filter elements require a longer rotating shaft, which for a specific shear rate reduces the resonant frequency. Therefore, the number of filter elements is limited by the resonant frequency. In contrast, in dynamic filter assemblies embodying the present invention where the housing rotates, much larger filter stacks may be utilized because high rotation rates may be achieved. The housing comprises a cylindrical structure of much larger diameter and stiffness than any shaft contained therein could comprise; accordingly, the resonant frequency of a spinning housing is much higher. Essentially, for embodiments of the present invention, the size of the filter stack is limited only by practical manufacturing constraints.

Figure 9:
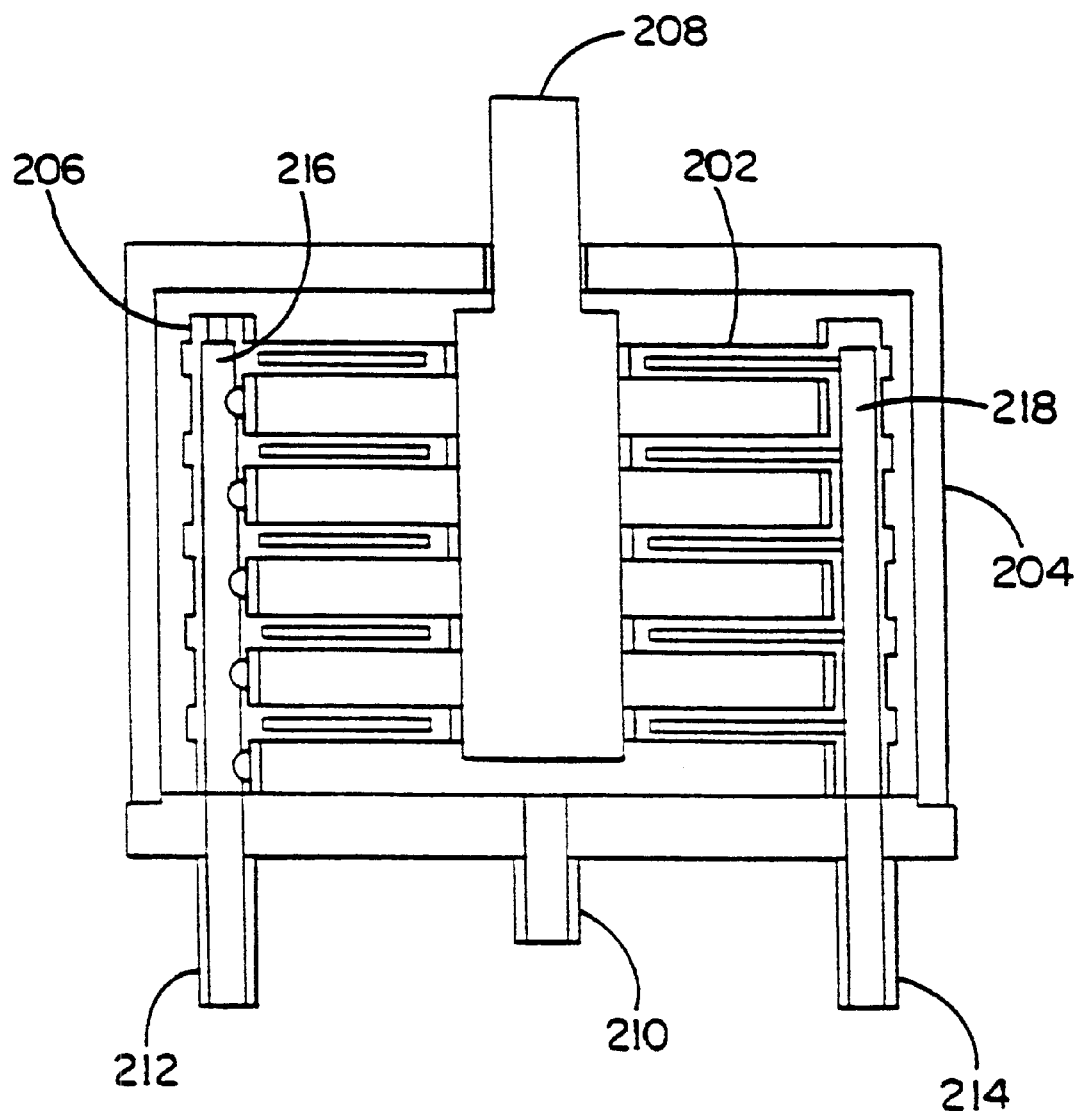
FIG. 9 is a diagrammatic representation of an alternative embodiment of the dynamic swirl filter assembly of the present invention.

In an alternative embodiment, the fluid may be rotated by a central rotatable shaft instead of or in addition to rotatable housing. For example, the stationary filter elements may be attached directly to a housing which is also stationary. FIG. 9 illustrates an embodiment in which the stationary filter elements 202 are attached directly to the stationary filter housing 204. Spacer discs may or may not be utilized in this embodiment. The filter elements 202 may be attached to the stationary filter housing 204 by mounting devices such as brackets. In the illustrated embodiment, stand alone mounting brackets 206 may be utilized to support the filter elements 212. A rotating central shaft 208 may be axially disposed within the central portion of the housing 204. The rotating central shaft 208 may comprise a smooth outer surface or include raised sections to aid in imparting angular momentum to the fluid. However, as in the situation with the rotating housing described previously, the rotating central shaft preferably comprises a smooth outer surface to avoid stagnant fluid areas. Further, the rotatable shaft 208 is substantially free of any structures, such as radially extending discs, which extend across the filter elements 202. Accordingly, the gap between each pair of filter elements 126 is also substantially free of any structure.

The principal of operation is similar to the previous embodiment. One or more process fluid inlets may be positioned in the central rotating shaft, and the permeate outlet and the retentate outlet may be coupled to the stationary housing. Alternatively, the one or more process fluid inlets may be coupled to the stationary housing. In the illustrated embodiment, the process fluid may be introduced through a single process fluid inlet 210 coupled to the lower end of the stationary filter housing 204, and the retentate and permeate removed from the stationary filter housing 204 via a retentate outlet 212 and a permeate outlet 214, both coupled to the lower end of the housing 204. The retentate outlet 212 communicates with a retentate conduit 216 which may run through the stand-alone bracket 206, and the permeate outlet 214 communicates with a permeate conduit 218 which may also run through the stand alone bracket 206. The rotating shaft 208 may be driven in the same manner as the filter housing previously described in the embodiment. However, the spin rate and power consumption for a rotating central shaft 208 design may be substantially larger than for a rotatable housing design to achieve the same shear rate on the filter surfaces.

Although shown and described is what is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A method for making a dynamic swirl filter assembly comprising:

mounting a plurality of filter elements to form a filter stack; and disposing the filter stack within a rotatable wall, wherein the rotatable wall is substantially free of structure which extends substantially across a surface of the filter elements.

2. A method for making a dynamic swirl filter assembly according to claim 1, wherein the rotatable wall is substantially cylindrical.

3. A method for making a dynamic swirl filter assembly according to claim 1, wherein the rotatable wall includes a substantially smooth inner surface.

4. A method for making a dynamic swirl filter assembly according to claim 1, wherein disposing the filter stack within the rotatable wall includes disposing the filter stack within a rotatable wall having an interior wall having protrusions extending toward the filter stack.

5. A method for making a dynamic swirl filter assembly according to claim 1, wherein disposing the filter stack within the rotatable wall includes positioning the central axis of the filter stack assembly coincident with the central axis of the rotatable wall.

6. A method for making a dynamic swirl filter assembly according to claim 1, further comprising:

disposing a protective structure around the rotatable wall.

7. A method for making a dynamic swirl filter assembly according to claim 1, further comprising:

disposing the filter stack within a rotatable housing cover, wherein the rotatable wall comprises an inner wall of the rotatable housing cover.

8. A method for making a dynamic swirl filter assembly according to claim 1, further comprising:

rotatably securing the rotatable wall to a support structure.

9. A method for making a dynamic a swirl filter assembly according to claim 1, wherein mounting the plurality of filter elements includes mounting the plurality of filter elements substantially parallel to one another.

10. A method for making a dynamic swirl filter assembly according to claim 1, wherein disposing the filter stack within the rotatable wall includes spacing the inner diameter of the rotatable wall from the filter elements less than about one-quarter of the radius of the filter elements.

11. A method for making a dynamic swirl filter assembly according to claim 1, wherein disposing the filter stack within the rotatable wall includes spacing the inner diameter of the rotatable wall from the filter elements less than about one-tenth of the radius of the filter elements.

12. A method for making a dynamic swirl filter assembly according to claim 1, wherein mounting the plurality of filter elements to form the filter stack includes forming a stationary filter stack.

13. A method for making a dynamic swirl filter assembly according to claim 1, wherein mounting the plurality of filter elements to form the filter stack includes forming a rotatable filter stack.

14. A method for making a dynamic swirl filter assembly according to claim 1, further comprising:

disposing a filter medium on a surface of a support to form a filter element.

15. A method for making a dynamic swirl filter assembly according to claim 1, further comprising:

disposing a filter medium on a surface of a curved or tapered support to form a filter element.

16. A method for making a dynamic swirl filter assembly according to claim 1, further comprising:

disposing a filter medium on a grooved surfaced of a support to form a filter element.

17. A method for making a dynamic swirl filter assembly according to claim 1, further comprising:

disposing a filter medium over substantially the entire surface of a support to form a filter element.

18. A method for making a dynamic swirl filter assembly according to claim 1, further comprising:

disposing a drainage layer between a filter medium and a support to form a filter element.

19. A method for making a dynamic swirl filter assembly according to claim 1, further comprising:

disposing a filter medium on a surface of a support to form a filter element, wherein the filter medium has an outer diameter no greater than the outer diameter of the support and an inner radius substantially equal to one-half the radius of the support.

20. A method for making a dynamic swirl filter assembly according to claim 1, wherein mounting the plurality of filter elements to form the filter stack includes mounting a plurality of spacers and the plurality of filter elements to form the filter stack.

21. A method for making a dynamic swirl filter assembly according to claim 1, further comprising:

mounting a cap to an end of the filter stack.

22. A method for making a dynamic swirl filter assembly according to claim 1, further comprising:

mounting a base to an end of the filter stack.

23. A method for making a dynamic swirl filter assembly according to claim 1, wherein mounting the plurality of filter elements to form the filter stack includes mounting a plurality of spacers and the plurality of filter elements to form the filter stack and further comprising mounting a cap to a first end of the stack and mounting base to a second end of the stack.

24. A method for making a dynamic swirl filter assembly according to claim 1, further comprising:

providing a permeate outlet through the filter stack.

25. A method for making a dynamic swirl filter assembly according to claim 1, further comprising:

providing a retentate outlet through the filter stack.

26. A method for making a dynamic swirl filter assembly according to claim 1, further comprising:

providing a process fluid inlet fluidly communicating with the interior of the rotatable wall.

27. A method for making a dynamic swirl filter assembly according to claim 1, further comprising:

disposing the filter stack within a rotatable housing cover, wherein the rotatable wall comprises a substantially smooth inner wall of the rotatable housing cover; and disposing first and second filter media on first and second opposite sides of a support to form a filter element.

28. A method for making a dynamic swirl filter assembly according to claim 1, further comprising:

providing a permeate outlet through the filter stack;

providing a retentate outlet through the filter stack;

wherein mounting the plurality of filter elements to form the filter stack includes mounting a filter element having permeate passages in fluid communication with the permeate outlet; and wherein the tetentate outlet includes an opening in fluid communication between adjacent filter elements in the stack.

29. A method for making a dynamic swirl filter assembly according to claim 1, wherein mounting the plurality of filter elements to form the filter stack includes mounting a plurality of spacers and the plurality of filter elements to form the filter stack; and further comprising providing seals between adjacent spacers;

providing seals between adjacent filter elements and spacers;

mounting a cap to a first end of the stack; and mounting a base to a second end of the stack.

30. A method for making a dynamic swirl filter assembly according to claim 1, further comprising:

disposing the filter stack within a rotatable housing cover, wherein the rotatable wall comprises a substantially smooth inner wall of the rotatable housing cover;

wherein mounting the plurality of filter elements to form the filter stack includes mounting a plurality of spacers and the plurality of the filter elements to form the filter stack;

providing seals between adjacent spacers;

providing seals between adjacent filter elements and spacers;

mounting a cap to a first end of the filter stack;

mounting a base to a second end of the filter stack;

providing a permeate outlet through the filter stack;

providing a retentate outlet through the filter stack, wherein the retentate outlet includes openings in fluid communication between adjacent filter elements in the stack; and disposing first and second filter media on first and second opposite sides of a support to form a filter element, wherein the filter element includes a permeate passage in fluid communication with a downstream layer of the filter media and the permeate outlet.

31. A method for making a dynamic swirl filter assembly according to claim 30, wherein disposing first and second filter media on first and second opposite sides of the support to form the filter element includes disposing first and second filter media on first and second sides of a tapered or curved support.

* * * * *